US011048283B2

(12) United States Patent
Mahajan et al.

(10) Patent No.: US 11,048,283 B2
(45) Date of Patent: *Jun. 29, 2021

(54) ADAPTIVE DIGITAL CONTROLLER INCLUDING LINEAR AND NON-LINEAR CONTROL MECHANISM

(71) Applicant: Intel Corporation, Santa Clara, CA (US)

(72) Inventors: Tarun Mahajan, Bangalore (IN); Ramnarayanan Muthukaruppan, Bangalore (IN); Rajesh Sidana, Bangalore (IN); Srinath B. Pai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,741

(22) Filed: Feb. 24, 2020

(65) Prior Publication Data
US 2020/0264645 A1 Aug. 20, 2020

Related U.S. Application Data

(63) Continuation of application No. 15/484,404, filed on Apr. 11, 2017, now Pat. No. 10,635,124.

(51) Int. Cl.
*G05F 1/575* (2006.01)
*H02M 1/00* (2006.01)

(52) U.S. Cl.
CPC ...... *G05F 1/575* (2013.01); *H02M 2001/0025* (2013.01)

(58) Field of Classification Search
CPC .............. G05F 1/575; H02M 3/157; H02M 2001/0016–00022
See application file for complete search history.

(56) References Cited

U.S. PATENT DOCUMENTS 7,777,461 B2   8/2010 Martin et al.
8,587,274 B2   11/2013 Strydom et al.
(Continued)

FOREIGN PATENT DOCUMENTS

CN   110431511   11/2019
WO   2013165401   11/2013
(Continued)

OTHER PUBLICATIONS

"International Application Serial No. PCT US2018 025897, International Search Report dated Jul. 26, 2018", 4 pgs.
(Continued)

*Primary Examiner* — Peter M Novak
(74) *Attorney, Agent, or Firm* — Schwegman Lundberg & Woessner, P.A.

(57) ABSTRACT

Some embodiments include apparatuses and methods of using such apparatuses. One of the apparatuses includes a control circuitry to generate error information based on a value of the feedback voltage generated from an output voltage, generate output information to control a power switching unit based on the error information provided to a forward path in the control circuitry, and adjust a gain of the forward path based on a gain factor computed based at least in part on a first value of the output information in order to cause the output information to have a second value. The control circuitry also computes a value of correction information when the output voltage is within a target value range, and adjusts the control information, based on the correction information, when the output voltage is outside the target value range.

20 Claims, 12 Drawing Sheets

(56) References Cited

U.S. PATENT DOCUMENTS

| | | | |
|---|---|---|---|
| 8,803,499 | B2 | 8/2014 | Sreenivas et al. |
| 10,635,124 | B2 | 4/2020 | Mahajan et al. |
| 2007/0210777 | A1 | 9/2007 | Cervera et al. |
| 2010/0064124 | A1 | 3/2010 | Rinne et al. |
| 2014/0002042 | A1 | 1/2014 | Wismar et al. |
| 2014/0125306 | A1 | 5/2014 | Babazadeh et al. |
| 2014/0266119 | A1 | 9/2014 | Burton et al. |
| 2014/0333281 | A1* | 11/2014 | Li .................. G06F 1/3203 323/318 |
| 2015/0155780 | A1 | 6/2015 | Searles et al. |
| 2016/0276931 | A1 | 9/2016 | Trichy et al. |
| 2016/0282889 | A1 | 9/2016 | Mahajan et al. |
| 2018/0292851 | A1 | 10/2018 | Mahajan et al. |

FOREIGN PATENT DOCUMENTS

| | | |
|---|---|---|
| WO | 2015094252 | 6/2015 |
| WO | 2018191067 | 10/2018 |

OTHER PUBLICATIONS

"International Application Serial No. PCT US2018 025897, Written Opinion dated Jul. 26, 2018", 9 pgs.

"U.S. Appl. No. 15/484,404, Non Final Office Action dated Apr. 18, 2019", 13 pgs.

"U.S. Appl. No. 15/484,404, Respnse filed Jul. 18, 2019 to Non Final Office Action dated Apr. 18, 2019", 16 pgs.

"U.S. Appl. No. 15/484,404, Final Office Action dated Aug. 21, 2019", 14 pgs.

"U.S. Appl. No. 15/484,404, Response filed Oct. 21, 2019 to Final Office Action dated Aug. 21, 2019", 11 pgs.

"International Application Serial No. PCT US2018 025897, International Preliminary Report on Patentability dated Oct. 24, 2019", 11 pgs.

"U.S. Appl. No. 15/484,404, Advisory Action dated Nov. 7, 2019", 3 pgs.

"U.S. Appl. No. 15/484,404, Response filed Nov. 20, 2019 to Advisory Action dated Nov. 17, 2019", 7 pgs.

"U.S. Appl. No. 15/484,404, Notice of Allowance dated Dec. 18, 2019", 8 pgs.

"U.S. Appl. No. 15/484,404, Corrected Notice of Allowability dated Feb. 19, 2020", 2 pgs.

"European Application Serial No. 18783866.9, Extended European Search Report dated Nov. 25, 2020", 18 pgs.

* cited by examiner

100

ADAPTIVE DIGITAL CONTROLLER INCLUDING LINEAR AND NON-LINEAR CONTROL MECHANISM

CROSS-REFERENCE TO RELATED APPLICATION

This application is a continuation of U.S. patent application Ser. No. 15/484,404, filed Apr. 11, 2017, which is incorporated by reference herein in its entirety.

TECHNICAL FIELD

Embodiments described herein pertain to power management in electronic systems. Some embodiments relate to voltage regulators.

BACKGROUND

Many electronic devices or systems (e.g., computers, tablets, and cellular phones) have power management components (e.g., voltage regulators) to control voltage (e.g., supply voltage) in the device or system. The power management components regularly monitor the value of voltage in the device or system in order to maintain the voltage within a target value range. During device transient events (e.g., a surge in current consumption) in the operations of the device, the value of the voltage may suddenly deviate from the target value range. Some conventional techniques provide control mechanisms to deal with such events. However, different devices have different operational schemes. Thus, some conventional control. mechanisms designed to work with certain devices may be unsuitable for some other devices.

DETAILED DESCRIPTION

Figure 1:
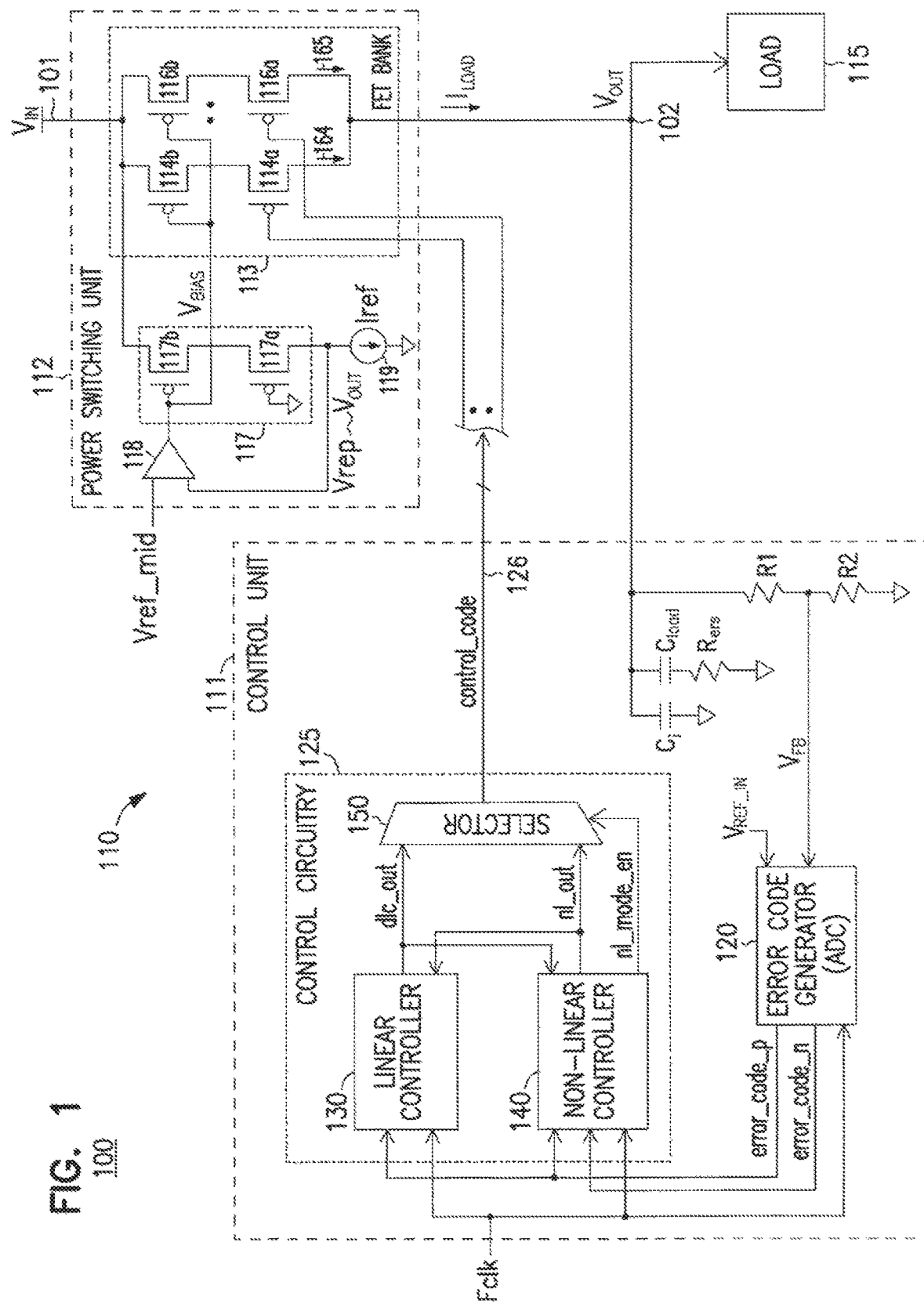
FIG. 1 shows a block diagram of an apparatus including a voltage regulator and a load, according to some embodiments described herein.

In many devices (e.g., processors), power management (e.g., fine-gain power-management using dynamic voltage and frequency scaling (DVFS)) becomes important in improving performance relative to power ratio in different power states of the device. In these devices, entry and exit from certain operating modes (e.g., idle to burst mode) can happen very quickly (e.g., in few core clock cycles with core frequency in GHz range). Functional units (e.g., multi-core central processing units (CPUs)) in these devices may operate with a wide load current ($I_{LOAD}$) range, which in turn can lead to wide variation in the rate (di/dt) at which the load current changes during load step (when load current increases). These fast load transients (e.g., fast changes in load current) can result in large droops (a sudden decrease in voltage value) on the supply voltage of a device where on-die load capacitance may be limited (e.g., due to small die area). Such droops in the supply voltage could limit the speed (e.g., core frequency) of the device.

Conventional low-dropout (LDO) regulator circuitry provides a viable low-cost solution where switching voltage controller integration into die/package is impractical. The LDO circuitry can also allow second-level power management (a second level of fine-grain power management) if a voltage supply from the same supply rail provides power to multiple functional units in the same device. LDO circuitry can allow optimal voltage supply for each functional unit. Digital LDO circuitry is becoming increasingly popular due to its scalability and ultra-low voltage operation (near-threshold operation) where analog circuits may be unsuitable. The digital control of LDO circuitry and associated power transistors may allow flexibility for device re-configurability. Some conventional linear digital controllers can provide a stable and smooth transient response with low steady-state error for different ranges of load current and output voltage conditions. However, such linear digital controllers may operate with fixed sampling frequency and may be limited by the band-width of the control loop. This may make such conventional linear controllers unsuitable to provide sufficient responses during some operating conditions, such as fast transient responses during droop events.

Further, some conventional linear control techniques are designed for a relatively smaller range of load current and for worst case operating conditions. Such techniques may fail to provide an adequate response for a relatively wider load current range. Plus, even for a small load current range, loop performance in such conventional linear control techniques may degrade because the conventional techniques usually apply fixed compensation to correct errors caused by the droop, regardless of load variations. Moreover, lack of robust non-linear control is prone to over-correction and under-correction for a relatively wider range of load current and large variation in start and end points of the rate of change of load current across an output voltage range.

The techniques described herein with reference to FIG. 1 through FIG. 11 include a voltage regulator including digital linear control and non-linear control that can support wide load current and voltage dropout range. Detailed circuit elements, operations, and improvements are described below with reference to FIG. 1 through FIG. 11.

FIG. 1 shows a block diagram of an apparatus 100 including a voltage regulator 110 and a load 115, according to some embodiments described herein. Apparatus 100 can include or be included in an electronic device or system, such as a computer (e.g., desktop, laptop, or notebook), a tablet, a cellular phone, wearable electronics (e.g., smart watches), or other electronic devices or systems.

As shown in FIG. 1, a voltage regulator 110 can include a control unit 111 to generate control information (e.g., a digital code) control_code to control a power switching unit 112. Control unit 111 can monitor and detect an error in the value of a voltage $V_{OUT}$ at a node 102 to control (e.g., adjust) the value of control information control_code in order to maintain the value of voltage $V_{OUT}$ at a target value. An error in the value of voltage $V_{OUT}$ can occur when the value of voltage $V_{OUT}$ deviates from the target value. The target value can be a voltage value within a target value range (e.g., a pre-determined value range).

Power switching unit 112 can be controlled by control unit 111 such that a difference in values between a voltage $V_{IN}$ (e.g., supply voltage $V_{CC}$) and $V_{OUT}$ (e.g., output voltage) is relatively small (e.g., low drop-out (LDO)). Thus, the value of $V_{OUT}$ can be less than the value of voltage $V_{IN}$ by a relatively small amount. Therefore, voltage regulator 110 can operate as a low-drop out (LDO) voltage regulator.

Load 115 may use voltage $V_{OUT}$ as its supply voltage (e.g., regulated supply voltage). Load 115 can include or be included in a functional unit such as a processor (e.g single-core processor, a multicore processor) that can include at least one a central processing unit (CPU), a memory device, or other functional units. Voltage regulator 110 and load 115 can be located on (e.g., formed in, formed on, or integrated in) the same integrated circuit (IC) die (e.g., an IC chip). The IC die can include a semiconductor die (e.g., a silicon die). Alternatively, voltage regulator 110 and load 115 can be located on different IC die. For example, voltage regulator 110 can be located on one IC die of a device on a circuit board (e.g., motherboard), and load 115 can be located on a different IC die of another device on the circuit board. Power switching unit 112 can be formed outside voltage regulator 110 and load 115 (e.g., excluded from an IC die (or IC dice) There voltage regulator 110 and load 115 are located. Alternatively a portion of power switching unit 112 or the entire power switching unit 112 can be located on (e.g., formed in, formed on, or integrated in) the same IC die with voltage regulator 110. Apparatus 100 can include or be included in a system on chip (SoC), such that voltage regulator 110 and load 115 can be included (e.g., integrated) in the SoC.

Voltage regulator 110 can operate in linear mode (e.g., steady state mode) and non-linear mode. Voltage regulator 110 can operate in a linear mode if an error in voltage $V_{OUT}$ has a value less than a specific (e.g., predetermined) value (e.g., when the value of $V_{OUT}$ is within a target value range). Voltage regulator 110 can change from a linear mode to a non-linear mode if the error in voltage $V_{OUT}$ has a value greater than that specific value (e.g., when the value of $V_{OUT}$ is outside the target value range). The error that causes voltage regulator 110 to change from the linear mode to the non-linear mode may include a droop in voltage $V_{OUT}$ (e.g., a decrease in the value of $V_{OUT}$). Such a droop (or droop event) may occur during a load transient event at load 115. A load transient event may occur when load 115 changes from one operating state (e.g., an idle state) to another operating state((e.g., an active state). As described in more detail with reference to FIG. 2 through FIG. 9, voltage regulator 110 can adaptively and dynamically correct errors (e.g., correct droops) in voltage $V_{OUT}$ until the value of voltage $V_{OUT}$ returns to a target value.

As shown in FIG. 1, control unit 111 can include an error code generator 120, control circuitry 125 including a digital linear controller 130 and a non-linear controller 140, and a selector 150 (e.g., a multiplexer). Control unit 111 can also include a capacitor $C_i$, a capacitor $C_{load}$ (e.g., load capacitor), a resistor $R_{ers}$, and resistors R1 and R2 (e.g., a voltage divider). The components of control unit 111 can form digitally-controlled LDO circuitry in a closed loop to control the value of voltage $V_{OUT}$ in both linear and non-linear modes of voltage regulator 110.

Error code generator 120 can operate to generate error information (e.g., digital error code) error_code_p and error information (e.g., digital error code) error_code_n based on errors in voltages $V_{OUT}$. An error in voltage $V_{OUT}$ occurs when the value of voltage $V_{OUT}$ deviates from a target value.

Digital linear controller 130 can generate output information (e.g., a digital linear output code) dlc_out based on error information error_code_p. Output information can be used during the linear mode to maintain the value of voltage $V_{OUT}$ at zero error or near zero error in steady-state.

Non-linear controller 140 can generate output information (e.g., a digital non-linear output code) nl_out based on error information error_code_p and error information error_code_n. Non-linear controller 140 can also generate a signal nl_mode_en (the non-linear mode enable signal), which can be activated (e.g., changed from a lower signal level (e.g., logic zero level) to a higher signal level (e.g., logic one level)) to indicate an entry into the non-linear mode (from the linear mode). Output information nl_out can be used during the non-linear mode to improve transient responses of voltage regulator 110 during load steps (e.g., when current at node 102 increases).

Selector 150 can select (based on the signal level of signal nl_mode_en) either output information dlc_out or output information nl_out to be control information control_code at output port 126 of control circuitry 125, depending on which mode (e.g., linear or the non-linear mode) voltage regulator 110 operates at a particular time. Thus, in the linear mode, control information control code is based on output information dlc_out (e.g., control_code=dlc_out in the linear mode), and in the non-linear mode, control information control_code is based on output information nl_out (e.g., control_code=nl_out in the non-linear mode). As an example, if each output information dlc_out and output information dlc_out is an N-bit code (where N is the number of bits), then control information control_code is also an N-bit code in either the linear mode or the non-linear mode. Thus, in this example, control_code=dlc_out=N in the linear mode, and control_code=nl_out=N in the non-linear mode.

For simplicity, this description sometimes uses either the term 'control_code' (with quotation marks) or the term control_code (without quotation marks and without the associated label "control information") to refer to control information control_code or the value (e.g., the value of N bits) of control information control_code. Similarly, the term 'dlc_out' (with quotation marks) or the term dlc_out (without quotation marks) refers to output information dlc_out or the value (e.g., the value of N bits) of output information dlc_out. And the term 'nl_out' (with quotation marks) or the term nl_out (without quotation marks) refers to output information nl_out or the value (e.g., the value of N bits) of output information nl_out. The same pattern applies to other items (e.g., variables or parameters) described herein, such that a particular term (with or without quotation marks) associated with an item refers to the name or the value of such an item.

As shown in FIG. 1, error code generator 120 can receive voltages $V_{FB}$ and $V_{REF\_IN}$. The voltage $V_{FB}$ is a feedback voltage that can be generated based on voltage $V_{OUT}$. For example, the value of voltage $V_{FB}$ can be a divided value of voltage $V_{OUT}$ based on the values of resistors R1 and R2. Voltage $V_{REF\_IN}$ can be generated from a bandgap-based reference voltage (not shown). As described in more detail below, error code generator 120 can generate a range of reference voltages from voltage $V_{REF\_IN}$. Error code generator 120 can compare voltage $V_{FB}$ with the range of reference voltages, and generate error information error_code_p and error_code_n based on the result of the comparisons. Error code generator 120 can receive a clock signal Fclk (e.g., a sampling clock signal) that can be used as timing for the comparisons. Each of error information error_code_p and error information error_code_n is a digital code (e.g., digital error code) that includes a number of bits. Error code generator 120 can generate error information error_code_p based on a comparison of voltage $V_{FB}$ and the range of reference voltages at positive edges (e.g., rising edges) of clock signal Fclk. Error code generator 120 can generate error information error_code_n based on a comparison of voltage $V_{FB}$ and the range of reference voltages at negative edges (e.g., falling edges) of clock signal Fclk.

Control circuitry 125 can use control information control_code to control (e.g., turn on or turn off) a number of current paths (e.g., "legs") in power switching unit 112 in order to maintain the value of voltage $V_{OUT}$ within a target value range. Control circuitry 125 can regularly adjust (e.g., update) the value of control information control_code (which can be either output information dlc_out or nl_out, depending of the mode of voltage regulator 110). As mentioned above, control information control_code can include a number of bits (e.g., N bits).

Output port 126 that provides control information control_code can include conductive nodes (e.g., part of parallel conductive lines) that can carry different signals (e.g., carry the signals in parallel on output port 126). Each of the signals on output port 126 can include signal levels corresponding to binary 0 (logic zero) and binary 1 (logic 1). The signal levels of the signals carried by output port 126 can represent the value control information control_code. For example, if control information control_code has 12 bits (e.g., N=12 bits), then output port 126 can include 12 nodes (or 12 conductive lines) to concurrently carry 12 respective signals that include the bit values of N=12 bits. As described above, control_code=dlc_out=N in the linear mode, and control_code=nl_out=N in the non-linear mode. Thus, in the example here, dlc_out includes N=bits, and nl_out includes N=bits.

As shown in FIG. 1, power switching unit 112 can include a transistor bank 113 including transistors (e.g., power transistors) 114a, 114b, 116a, and 116b coupled in between nodes 101 and 102. Transistors 114a, 114b, 116a, and 116b can include field effect transistor (FETs), such as p-channel FETs. Transistor bank (e.g., power FET bank) 113 can be binary-weighted transistor bank. Each of transistors 114a and 114b can be controlled by different bits among the bits (e.g., N bits) included in control information control_code.

Transistors 114a, 114b, 116a, and 116b can be parts of different current paths (e.g., parallel current paths) between nodes 101 and 102. For example, transistors 114a and 114b can be part of a current path 164, and transistors 116a and 116b can be part of a current path 165. In this description, current paths 164 and 165 are sometimes called "current legs" or simply "legs". Thus, the current flowing on each of current paths 164 and 165 can be called "current per leg" or alternatively "I_per_leg". Transistor bank 113 can provide a current $I_{LOAD}$ (e.g., load current).

FIG. 1 shows transistor bank 113 including only four transistors 114a, 114b, 116a, and 116b as an example. Transistor bank 113 can include a different number of transistors. The number of transistors of can be based on the number of bits (e.g., N bits) of control information control_code. For example, if control_code includes 12 bits, then transistor bank 113 can include 24 transistors (e.g., 12 transistors similar to transistors 114a and 116a coupled to another 12 transistors similar to transistors 114b and 116b). In this example, the 24 transistors can be parts of 24 different current paths (e.g., 24 legs) similar to current paths (e.g., legs) 164 and 165. As described above, voltage $V_{OUT}$ is maintained within a target value range during the steady state. Control information control_code can be used to control (e.g., turn on or turn off) an appropriate number of transistors (e.g., 114a and 116a) in order to control the value of voltage $V_{OUT}$.

As shown in FIG. 1, power switching unit 112 can also include a replica portion 117 that includes transistors 117a and 117b, an amplifier 118, and a reference current source 119 to generate a current Iref. The value of current Iref can be a predetermined (e.g., known) value. During operation, the transistors (e.g., transistors 114a, 114b, 116a, and 116b) of transistor bank 113 can form a current limiter acting as a controllable current source, with fixed current per leg (I_per_leg) maintained within reliability limits for higher dropouts (e.g., dropout of greater than 100 mV), using a replica portion 117. A dropout (or voltage dropout) is the difference between $V_{IN}$ and $V_{OUT}$ (e.g., dropout=$V_{IN}$−$V_{OUT}$).

Replica portion 117 can use amplifier 118 to receive a voltage (e.g., a reference voltage) Vref_mid to generate a voltage $V_{BIAS}$ to set the current per leg to be a multiple of current 'Iref'. However, the current source provided by the transistors (e.g., 114b and 116b) of transistor bank 113 has finite output resistance (Ro), which can vary with the dropout. For lower dropouts (e.g., dropouts of less than 100 mV), transistors 114b and 116b can behave like resistors (e.g., fully turned-on transistors) because voltage $V_{BIAS}$ may be zero (e.g., ground potential) or closer to zero, and current per leg can fall within safe limits but is no longer a constant. The current per leg depends on the dropout across transistors 114a, 114b, 116a, and 116b at lower dropouts. Transistors 114a and 116a are digitally controlled (e.g., turned on or turned off) based on the bits (e.g., N bits) of the control_code in order to turn on a corresponding number of legs. This allows power switching unit 112 to provide (e.g., source) enough current needed by load 115 at higher dropouts, or to maintain the voltage drop across transistors 114a, 114b, 116a, and 1 lob for the value of voltage $V_{OUT}$ at lower dropouts.

As described above, voltage regulator 110 can operate in linear and non-linear modes. In the linear mode (e.g., during steady state), control circuitry 125 can operate at fixed frequency with dlc_out updating at each positive clock edge based on error_code_p. Control circuitry 125 can activate signal nl_mode_en to enter the non-linear mode from the linear mode when a droop or an over-shoot event at $V_{OUT}$ is detected. Output information nl_out can be used to correct the droop at voltage $V_{OUT}$ in a much faster response than that of output information dlc_out. Non-linear controller 140 can operate at twice the frequency of digital linear controller 130. This can be achieved by generating 'error_code_p' and 'error_code_n' using both edges of clock signal Fclk. Control_code can switch between dlc_out and nl_out autonomously based on the latest values of error_code_p and error_code_n.

Thus, voltage regulator 110 can use dlc_out for control_code (e.g., control_code=dlc_out=N bits) during the linear mode, described below with reference to FIG. 2 through FIG. 6. Voltage regulator 110 can use nl_out for control_code (control_code=nl_out=N bits) during the non-linear mode, described below with reference to FIG. 7 through FIG. 9, FIG. 2 shows a schematic diagram of error code generator 120 of FIG. 1, according to some embodiments described herein. Error code generator 120 can include a reference generation circuitry 210 and an analog-to-digital converter (ADC) 220, which can include a windowed flash ADC. Reference generation circuitry 210 and ADC 220 can operate to generate a range of reference voltages for comparison with voltage $V_{FB}$ (which is based on voltage $V_{OUT}$) and for generation of error code error_code_p and error_code_n.

Reference generation circuitry 210 can generate a divided voltage $V_{DIV}$ based on $V_{REF\_IN}$ (e.g., a band-gap based voltage) and resistors R3 and R4 (e.g., a voltage divider). $V_{DIV}$ can be buffered by a unity-gain buffer 212 to generate a voltage Dac_ref, which is fed to a digital-to-analog converter (DAC) 214 (e.g., a 7-bit primary R-DAC). DAC 214 can include resistor circuitry 214a and a multiplexer circuitry (MUX) 214b (e.g., 2×MUX with 126 taps). DAC 214 can receive codes Dac_code 1 (e.g., 7-bit code) and Dac_code 2 (e.g., 7-bit code) and generate voltages Vref_top and Vref_bot at respective outputs of DAC 214. Voltages Vref_top and Vref_bot can be top- and bottom-most thresholds, respectively, of ADC 220.

Voltages Vref_top and Vref_bot can be buffered by unity-gain buffers 216a and 216b by to feed a secondary DAC 217 (e.g., R-DAC) to generate eight reference voltages Vref_tap_p1, Vref_tap_p2, Vref_tap_p4, Vref_tap_p6, Vref_tap_m1, Vref_tap_m2, Vref_tap_m4, and Vref_tap_m6 (collectively called "the ADC input reference voltages" for simplicity). The ADC input reference voltages are provided as input reference voltages to ADC 220 for determining the magnitude of error in voltage our in an error range (e.g., voltage $V_{OUT}$ in +/−60 mV error range).

The value of each of the eight ADC input reference voltages can be relative to a voltage Vref_mid, which can be a midpoint value between the values of Vref_tap_p6 and Vref_tap_m6, The value of each of Vref_tap_p1, Vref_tap_p2, Vref_tap_p4, Vref_tap_p6 can be the value of Vref_mid plus 1Vx, 2Vx, 4Vx, and 6Vx, respectively. Voltage Vx is an amount (e.g., predetermined amount) of voltage. For example, if Vx=6 mV, then Vref_tap_p1=Vref_mid+1Vx=Vref_mid+6 mV
Vref_tap_p2=Vref_mid+2Vx=Vref_mid+12 mV
Vref_tap_p4=Vref_mid+4Vx=Vref_mid+24 mV
Vref_tap_p6=Vref_mid+6Vx=Vref_mid+36 mV.

The value of each of Vref_tap_m1, Vref_tap_m2, Vref_tap_m4, Vref_tap_m6 can be the value of Vref_mid minus 1Vx, 2Vx, 4Vx, and 6Vx, respectively.

Thus, if Vx=6 mV (based on the above example), then
Vref_tap_m1=Vref_mid+1Vx=Vref_mid−6 mV
Vref_tap_m2=Vref_mid+2Vx=Vref_mid−12 mV
Vref_tap_m4=Vref_mid+4Vx=Vref_mid−24 mV
Vref_tap_m6=Vref_mid+6Vx=Vref_mid−36 mV.

Figure 2:
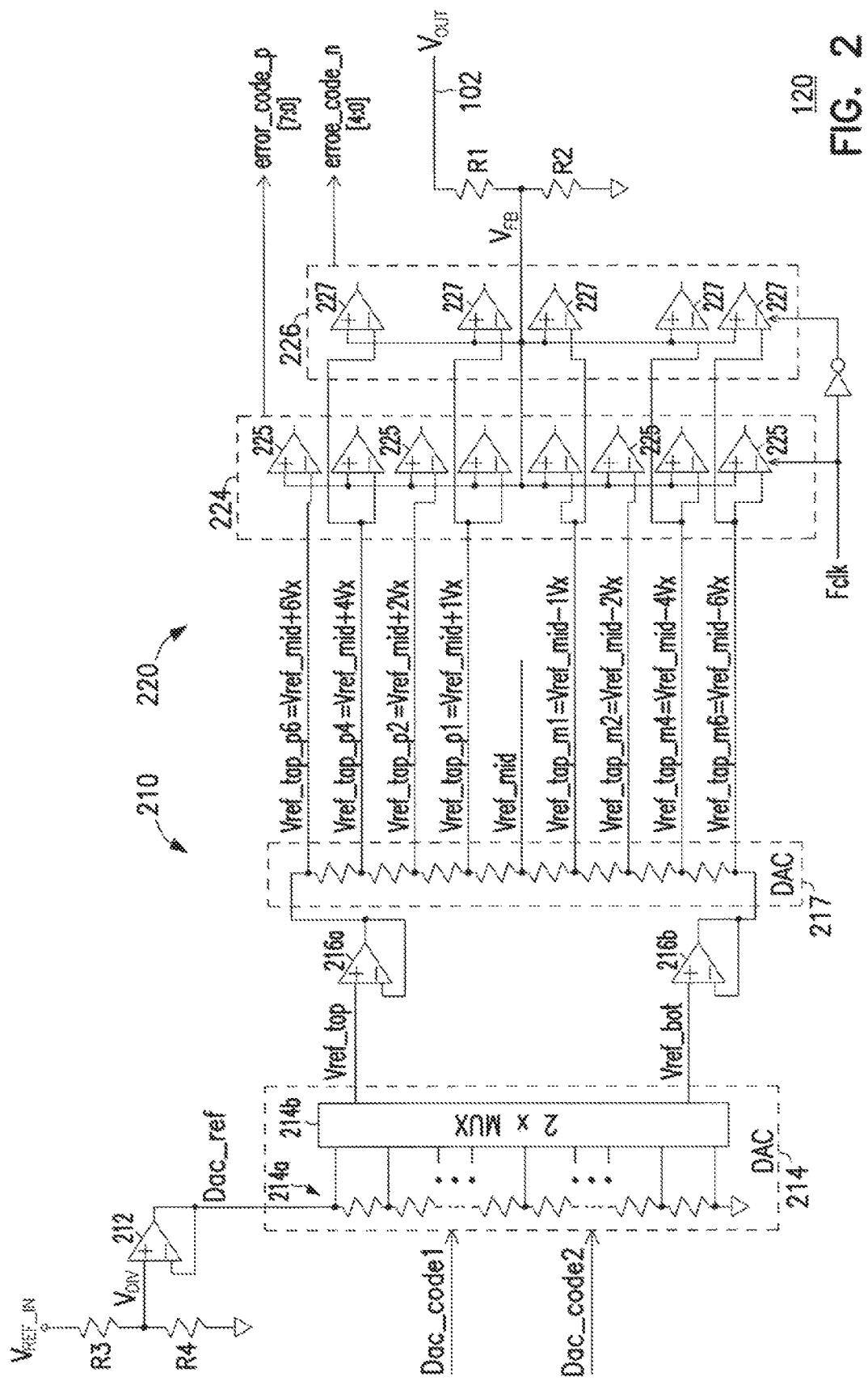
FIG. 2 shows a schematic diagram of an error code generator of the voltage regulator of FIG. 1, according to some embodiments described herein.

As shown in FIG. 2, ADC 220 can include a comparator circuit 224 having eight comparators 225 (e.g., positive-edge clocked comparators using clock signal Fclk) to compare $V_{FB}$ with each of the eight ADC input reference voltages. The outputs of comparators 225 can be obtained based on positive edges of clock signal Fclk. Based on the result of the comparison, comparator circuit 224 can generate error_code_p, which can include eight bits (8-bit thermometer code) [7:0]. Each of the eight bits [7:0] of error_code_p can be generated at one of comparators 225 at a positive edge of clock signal Fclk. The value of the bits [7:0] of error_code_p represents the voltage error of voltage $V_{OUT}$ obtained based on positive edges of $V_{OUT}$. The bits [7:0] of error_code_p is provided as input to digital linear controller 130 and non-linear controller 140 (FIG. 1) of control circuitry 125. Control circuitry 125 can perform a thermometric-to-binary conversion to convert bits [7:0] of error_code_p into positive ADC error levels pos_error_code +/−1, +/−2, +/−4, +/−6 (for example), where positive values (e.g., +1, +2, +4, and +6) can indicate a droop in $V_{OUT}$, and negative values (e.g., −1, −2, −4, and −6) can indicate an over-shoot in $V_{OUT}$. The value of error of $V_{OUT}$ can be based on pos_error_code (ADC error level) multiplied by a voltage value (e.g., a predetermined value). For example, the value of error of $V_{OUT}$ can be based on pos_error_code*10 mV.

As shown in FIG. 2, ADC 220 can also include a comparator circuit 226 having five comparators (e.g., negative-edge clocked comparators using clock signal Fclk) 227 to compare $V_{FB}$ with each of five input reference voltages (among the eight ADC five input reference voltages) Vref_tap_p1, Vref_tap_p4, Vref_tap_m1, Vref_tap_m4, and Vref_tap_m6. The outputs of comparators 227 can be obtained based on negative clock edges of clock signal Fclk. Based on result of the comparison, comparator circuit 226 can generate error_code_n, which includes five bits (5-bit thermometer code) [4:0]. Each of the five bits [4:0] of error_code_n can be generated at one of comparators 227 at a negative edge of clock signal Fclk. The value of the five bits [4:0] of error_code_n represents the voltage error of voltage $V_{OUT}$ obtained based on negative edges of clock signal Fclk. The bits [4:0] of error_code_n are provided as non-linear controller 140 (FIG. 1) of control circuitry 125. Control circuitry 125 can perform a thermometric-to-binary conversion to convert bits [4:0] of error_code_n into negative ADC error levels neg_error_code +/−1, +/−4, +/−6 (for example). During load step, if $V_{OUT}$ crosses a non-linear threshold (e.g., +/−4 corresponding to +/−40 mV output error) on either positive or negative clock edge (e.g., due to a droop or an over-shoot at $V_{OUT}$), then control circuitry 125 can enter the non-linear mode, and non-linear controller 140 can operate to correct the error.

In FIG. 2, comparators 225 and 227 of comparator circuits 224 and 226, respectively, can use auto-zero offset cancellation to ensure comparator offset is kept low (e.g., within +/−½ LSB (least significant bit)) and ADC output is monotonic.

Control circuitry 125 can perform a bubble correction on the 8-bit [7:0] thermometer code of error_code_p and the 5-bit [4:0] thermometer code of error_code_n to ensure proper thermometer to binary code conversion of the ADC error code. A calibration may be performed in the reference generation to improve the ADC input reference voltages provided to inputs of comparators 225. For example, online calibration can be used to trim the random offset of unity-gain buffers 216a and 216b. The effect of any residual offset in unity-gain buffers 216a and 216b may be on the ADC range and not on the delta between different references generated due to the use of secondary DAC 217.

FIG. 2 shows comparator circuits 224 and 226 including eight comparators 225 and five comparators 227, respectively, as an example. However, the number of comparators in one or both of comparator circuits 224 and 226 can vary. For example, the number of comparators in one or both of comparator circuit 224 and 226 can be increased to provide higher resolution or range.

Figure 7:
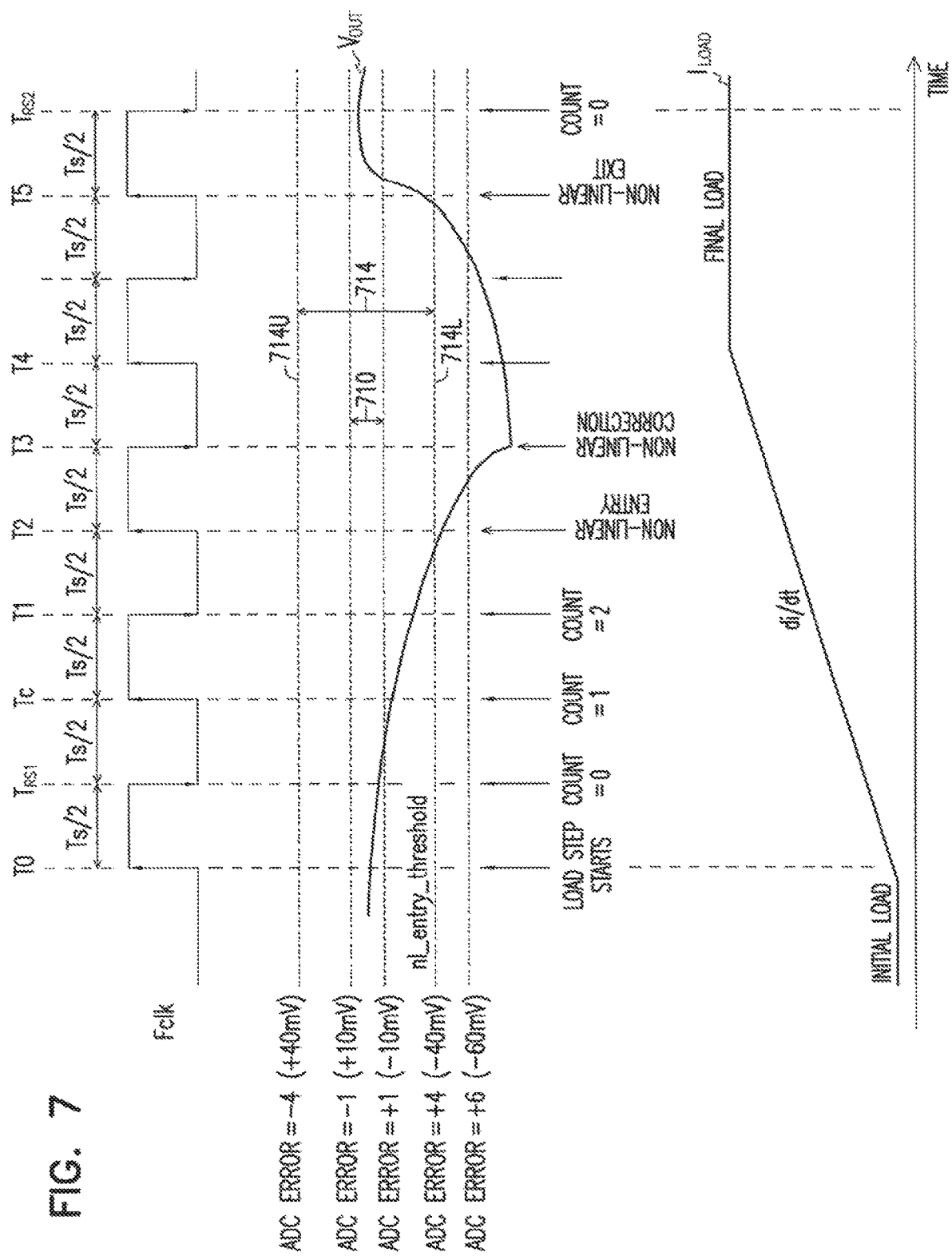
FIG. 7 shows an example waveform of an output voltage and a load current during an example droop event, according to some embodiments described herein.
Figure 8:
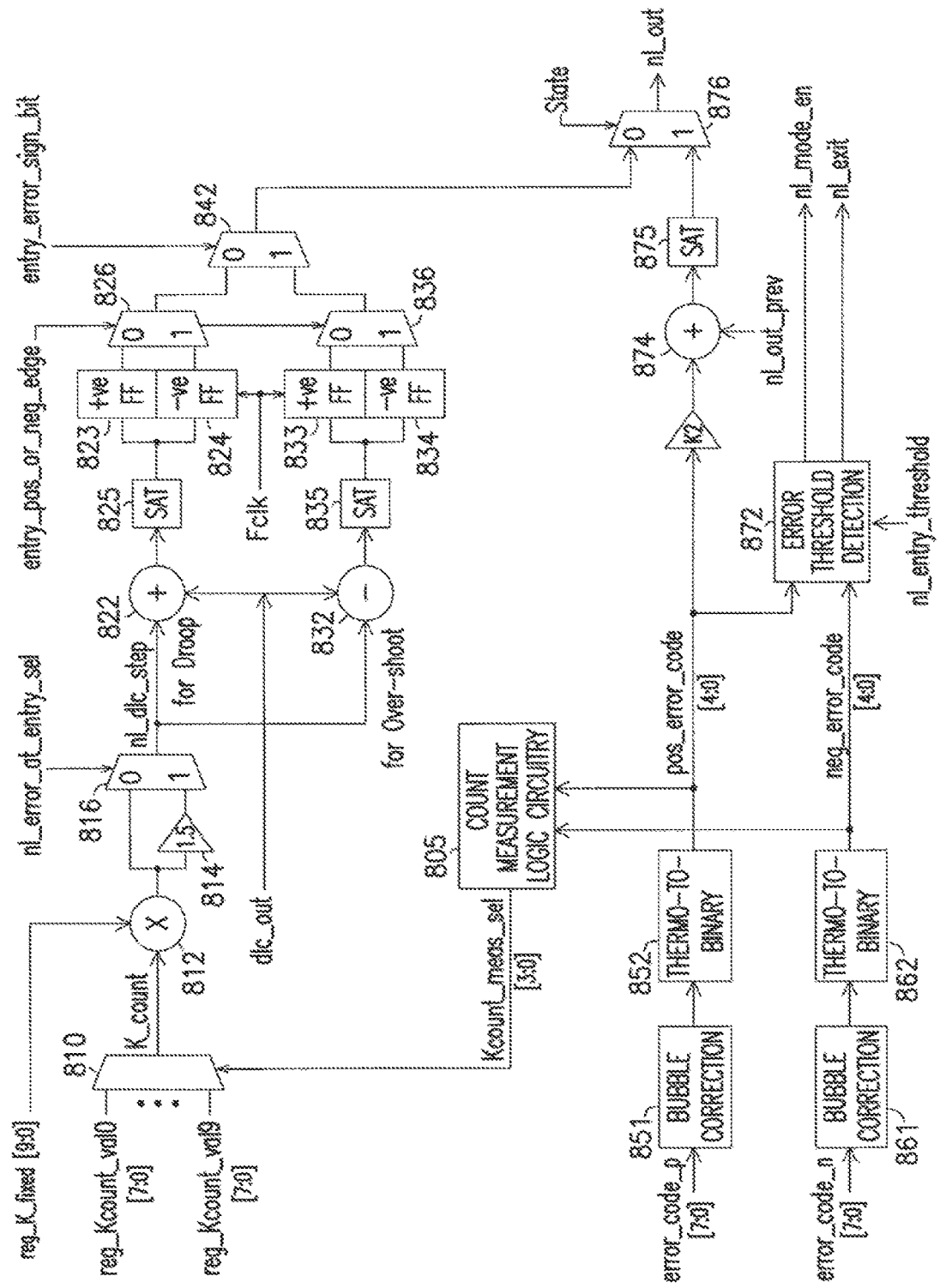
FIG. 8 shows a simplified architecture diagram of a non-linear controller of the voltage regulator of FIG. 1, according to some embodiments described herein.
Figure 9:
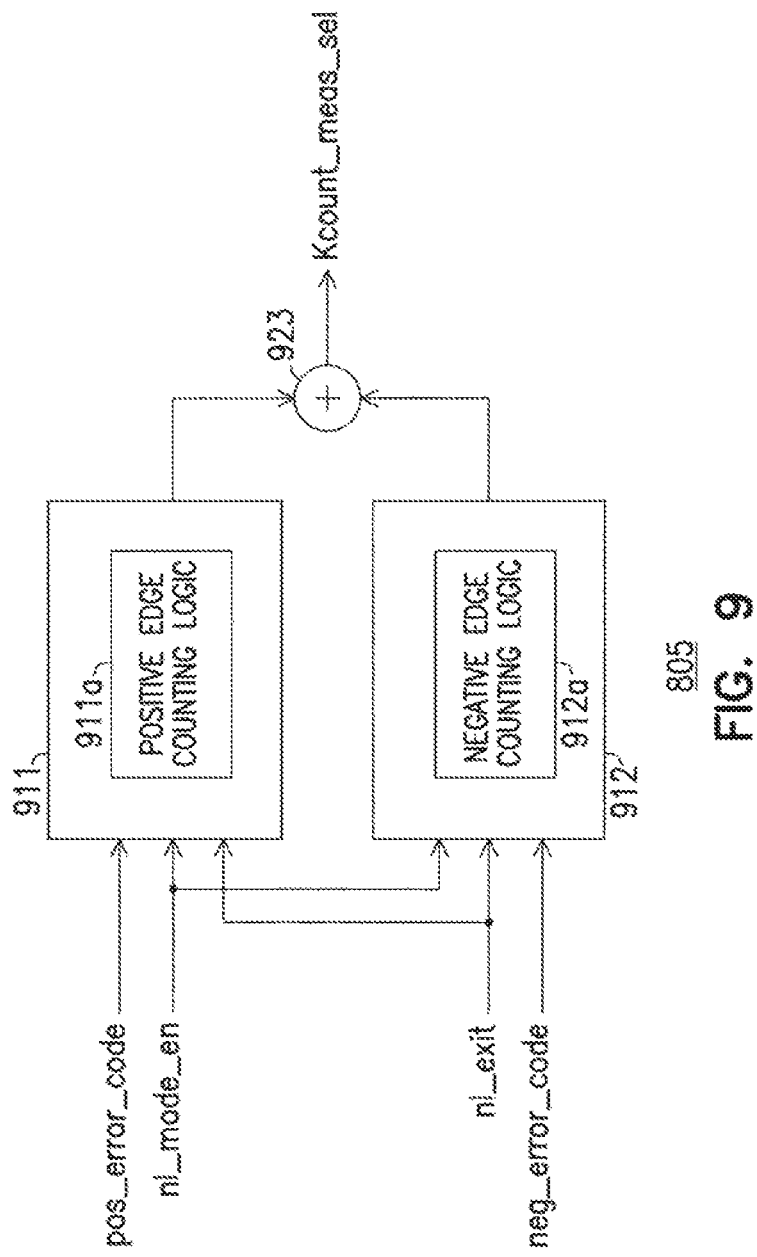
FIG. 9 shows a block diagram of count measurement logic circuitry of the non-linear controller of FIG. 8, according to some embodiments described herein.

The above description with reference to FIG. 1 and FIG. 2 discussed generation of error information error_code_p and error_code_n using error code generator 120. Non-linear controller 140 and digital linear controller 130 (FIG. 1) can use error information error_code_p and error_code_n to adjust the value of control information control_code in order to maintain the value of voltage $V_{OUT}$ within a target value range. The following description discusses structures and operations of digital linear controller 130 (FIG. 3 through FIG. 6) and non-linear controller 140 (FIG. 7 through FIG. 9).

Digital Linear Control Techniques

The operating condition of voltage regulator 110 (FIG. 1) can be defined by static parameters, including Vin (input voltage), $V_{OUT}$ (output voltage), current per leg (I_per_leg) of power switching unit 112, and on-resistance corresponding to process corners of the IC chip that include voltage regulator 110. The mentioned parameters may change over time, but their changes may not be as dynamic as the change of load current (e.g., $I_{LOAD}$) for a resistive load (e.g., load 115) during load transients. The on-die load capacitance may also vary based on the number of functional units processor cores in a multicore processor in load 115) that are turned on in a given state. The digital linear control techniques described herein employ dynamic load pole cancellation and dynamic adjusting of adaptive direct-current (DC) gain to effectively counter rapid changes in the load and slow changes in the operating condition of voltage regulator 110, as discussed below with reference to FIG. 3 through FIG. 6.

Plant Transfer Function

Figure 3:
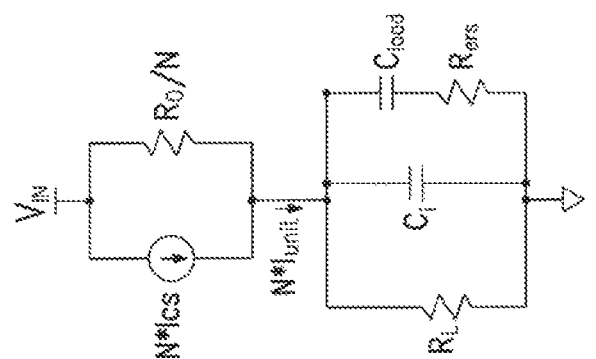
FIG. 3 shows a plant model for a power-FET (field-effect transistor) structure implemented in the voltage regulator of FIG. 1, according to some embodiments described herein.

FIG. 3 shows a plant model 305 for the digital linear control techniques that can be implemented in digital linear controller 130, according to some embodiments described herein. The plant model 305 of FIG. 3 can be used to describe a plant (transistor bank 113+load resistance $R_L$+load capacitor $C_{load}$) transfer function. Current Ics presents the ideal current source current value with output resistance $R_O$ in parallel. The combination of current Ics and output resistance $R_O$ is used to model the power-FET. The term 'N' represents control_code (e.g., N bits generated by digital linear controller 130 during the linear mode) that determines the number of legs (current paths) in transistor bank 113 to turn on. Besides load resistance $R_L$ varying over a wide load current range (e.g., 0.1 A to 15 A), output resistance $R_O$ of transistor bank 113 can vary, and the current per leg $I_{unit}$ can drop in low dropout range (e.g., less than 100 mV). Intrinsic capacitance $C_i$ may vary with the functional units (e.g., processor cores) in load 115 that are turned on. However, if the change in capacitance $C_i$ is small relative to the overall load capacitance, then capacitance $C_i$ can be ignored. The digital linear control techniques described herein can provide dynamic compensation to tighten the closed-loop response across the plant variations using a single set of coefficients.

The plant model 305, as shown in FIG. 3, is seen to have a second-order transfer function for d(Vout)/d(N) which can be re-written using approximate methods as shown below.

$$G(s) \approx \frac{G_0(1 + s/w_z)}{(1 + s/w_{p1})(1 + s/w_{p2})}$$

where $G_0$ is the DC voltage-gain per unit code change, $w_z$ is the zero, and $w_{p1}$, $w_{p2}$ are the poles of the transfer function.

where, $$G_0 = \left(\frac{I_{unit}}{R_o/N + R_L} R_o/N\right) \cdot R_L \text{ or}$$

$$G_0 = I_{unit}(R_L \| (R_o/N)),$$

$$w_z = 1/(R_{esr} C_{load}),$$

$$w_{p1} = 1/((R_{esr} + (R_L \| (R_o/N))C_{load}),$$

$$w_{p2} = 1/((R_{esr} \| R_L \| (R_o/N))C_i)$$

$R_{esr}$ is mostly a value per unit of $C_{load}$. Thus, $R_{esr} * C_{load}$, and $w_{z1}$ can remain a constant. $C_i$ is also generally much smaller than $C_{load}$. Therefore, $w_{p2}$ does not change significantly for amplitude and phase response of the transfer function in the band of interest. However, load resistance $R_L$, N, and $G_0$ can vary significantly with the load current, The term 'N' represents control_code, which is equal to dlc_out in linear mode (e.g., control_code=dlc_out=N in linear mode). For example, a change in load current from 250 mA to 15 A can cause a ratio change of 6000 in $R_L$ (where $R_L$=Nominal Output voltage (e.g., $V_{OUT}$)/Load Current). Similar scale changes can happen in N (where N=Load current/$I_{unit}$) and hence in $G_0$. Thus, the dominant pole $w_{p1}$ and DC-gain $G_0$ can vary widely with the changes in load current. Output resistance $R_o$ can also vary with voltage dropout, and $R_L$ can further vary within some output voltage ranges (e.g., 0.5V to 1.13V). Designing a digital compensator with fixed coefficients for such a plant, which can change significantly (as discussed above), can pose a challenge. However, as described below, the techniques described herein provide fixed coefficients (e.g., a single set of coefficients) using a digital compensator across a wide load. range without impacting (e.g., without degradation) in transient performance or stability. The digital compensator discussed here and below can be included in (e.g., part of) digital linear controller 130 of FIG. 1.

Adaptive Pole Cancellation and Adaptive DC Gain Equations

The digital compensator (which can be included in digital linear controller 130), based on the techniques described herein, implements a dynamic zero to cancel the dynamic dominant pole of the plant, and an adaptive DC-gain to cancel changes in DC-gain of the plant. Thus, the transfer function of the digital compensator in the loop would have a dynamic (or adaptive) DC-gain which is inverse to the change in the plant, and a dynamic (or adaptive) zero to cancel the dynamic pole in the plant across varying operating conditions.

Hence, with this understanding, and writing ($R_L \| R_o/N$) in short form as '$R_{eq}$', the initial transfer function of the digital compensator can be written as follows.

$$H(s) \alpha H_0(1 + s/W_z) \text{ where, } H_0 \alpha \frac{G_{setpoint}}{I_{unit}(R_{eq})}$$

where $G_{setpoint}$ is the plant DC Gain at setpoint used for coefficient computation, and $W_z = 1/((R_{esr} + R_{eq})C_{load})$ same as $w_{p1}$ of the Plant -continued $$H(s) \alpha \frac{G_{setpoint}}{(I_{unit}R_{eq})} \times (1 + s(R_{esr} + R_{eq})C_{load})$$

$$H(s) \alpha \frac{G_{setpoint}}{(I_{unit}R_{eq})}(1 + sR_{esr}C_{load}) + \frac{G_{setpoint}}{(I_{unit})}(sC_{load})$$

In this form, the $R_{eq}$ (=$R_L \| R_o/N$) term occurs only as a gain factor in the first term and is completely absent in the second term. That is, the digital compensator can be implemented with adaptive gain, and adaptive coefficients can be ignored (e.g., implemented with only adaptive gain without adaptive coefficients). Besides the dynamic zero, the digital compensator also has a static pole to set the target bandwidth and a proportional integrator (PI) to stabilize the system and reduce steady-state error. The following equation indicates the full transfer function of the digital compensator including the static pole and the PI compensator.

$$H(s) = \left(\frac{G_{setpoint}}{(I_{unit} \cdot R_{eq})}(1 + sR_{esr}C_{load}) + \frac{G_{setpoint}}{(I_{unit})}(sC_{load})\right) \cdot \left(K_p + \frac{K_i}{s}\right) \cdot \left(\frac{1}{(1 + s/W_p)}\right)$$

where $W_p$ is the pole, and $K_p+K_i/s$ is the PI compensator. $R_{esr}$ is mostly a value computed per unit of $C_{load}$ and hence '$R_{esr}C_{load}$' is a constant and can be written as '$R_{uesr}$'. Based on the above, the adaptive DC gain terms can be expressed as follows.

$$\text{Adaptive Gain 1, } AG_1 = \frac{G_{setpoint}}{(I_{unit} \cdot R_{eq})}, \text{ and}$$

Adaptive Gain 2, $AG_2 =$ $$\frac{G_{setpoint}}{(I_{unit})} = > H(s) = (AG_1(1 + sR_{uesr}) + AG_2sC_{load})\left(\frac{K_i + sK_p}{(s)(1 + s/W_p)}\right) = >$$

$$H(s) = \left(AG_1\left(\frac{1}{s} + R_{uesr}\right) + AG_2C_{load}\right)\left(\frac{K_i + sK_p}{(1 + s/W_p)}\right)$$

where H(s) is a strict function and can hence be implemented.

Z-Domain Implementation

For implementing in z-domain, the s-transfer function can be converted into a z-transfer function using the bilinear or Tustin transformation of $$s = (z - 1)/(z + 1) * 2/T.$$

$$H(z) = \left(\frac{T}{2}\left(\frac{AG_1 \cdot ((z+1) \cdot (2 \cdot R_{uesr})) + AG_2 \cdot C_{load} \cdot (z+1)}{z-1}\right)\right)\left(\frac{A_0 + zA_1}{(B_0 + zB_1)}\right)$$

where $A_1$, $A_1$, $B_0$, and $B_1$ are constants.

Simplifying $$H(z) = \left(\frac{AG_1 \cdot (a_0 + a_1z^{-1} + a_2z^{-2}) +}{AG_2 \cdot (a'_0 + a'_1z^{-1} + a'_2z^{-2})}\right)$$

where $a_0$, $a_1$, $a_2$, $a'_0$, $a'_1$, $a'_2$, $b_1$, and $b_2$ are the coefficients of the digital compensator that can be programmed, and $AG_1$ and $AG_2$ are the adaptive gain multiplier factors in the two forward numerator paths of the digital compensator, which can be included in digital linear controller 130 of FIG. 1.

Implementation of the Described Digital Compensator

Figure 4:
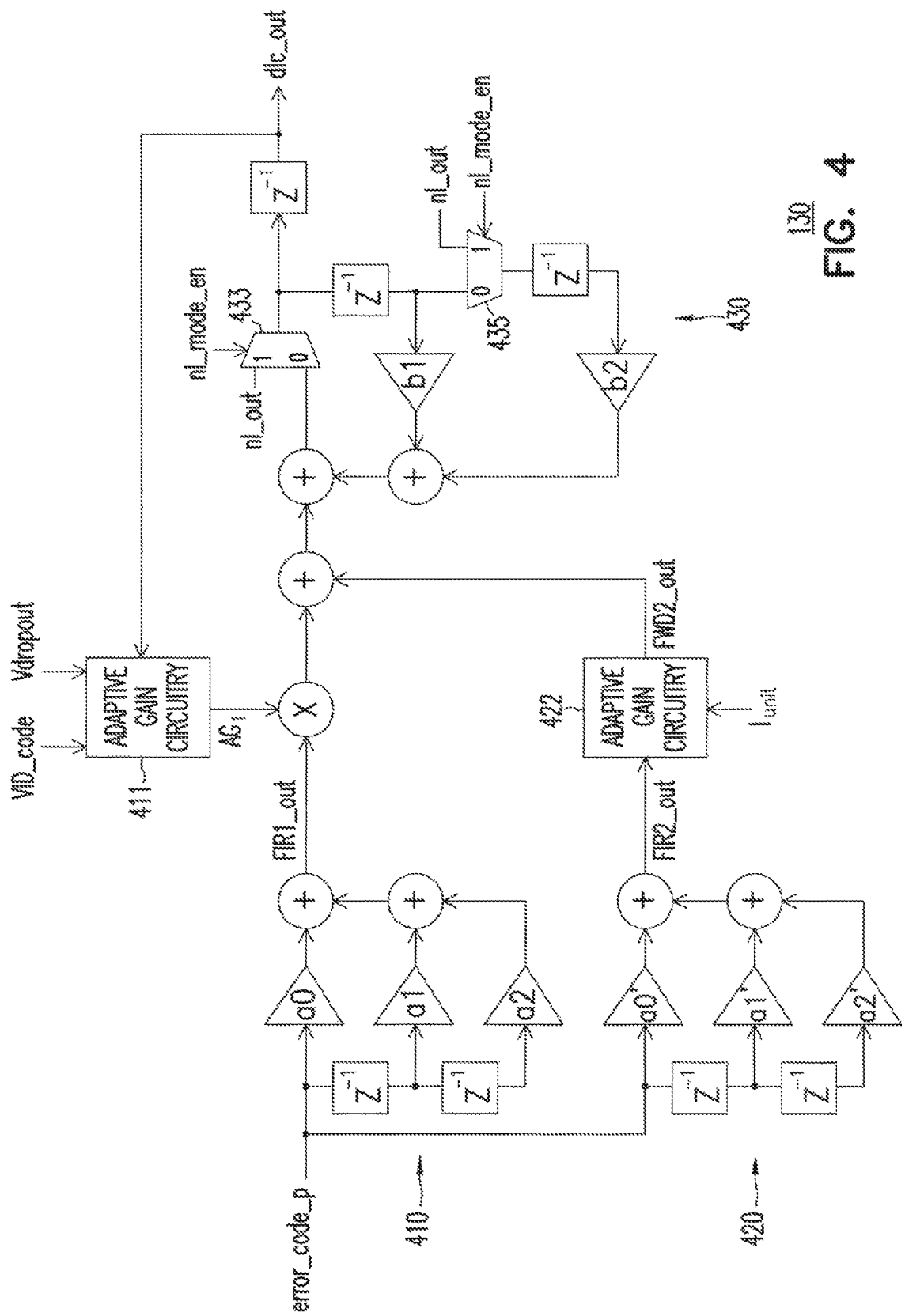
FIG. 4 illustrates a simplified implementation of a digital linear controller of the voltage regulator of FIG. 1, according to some embodiments described herein.

FIG. 4 illustrates a simplified implementation of digital linear controller 130 of FIG. 1, which can include the digital compensator based on the z-transfer function H(z) described above, according to some embodiments described herein. As shown in FIG. 4, digital linear controller 130 can include forward paths (e.g., finite impulse response (FIR) filters) 410 and 420 that include respective adaptive gain circuitry 411 (which can provide adaptive gain multiplier factor AG1), and adaptive gain circuitry 422 (which can provide adaptive gain multiplier factor AG2). Digital linear controller 130 can include a feedback path 430. The FIR filters of forward paths 410 and 420 can provide information (FIR filter outputs) FIR1_out and FIR2_out, respectively. Forward path 420 can provide information (output of forward path 420) FWD2_out, which is added to the output of forward path 410 before subtracting the output of feedback path 430.

As shown in FIG. 4, coefficients a0, a1, and a2 are fixed coefficients in forward path 410, coefficients a0', a1', and a2'are fixed coefficients in forward path 420, and coefficients b1 and b2 are the fixed coefficients in feedback path 430. For simplicity, feedback path 430 can be implemented using adders (as shown in FIG. 4) by reversing the sign of coefficients b1 and b2.

In FIG. 4, adaptive gain circuitry 411 uses information VI) code (known digital information corresponding to $V_{nom}$, and $V_{nom}$ can be a target $V_{OUT}$), and Vdropout (e.g., $V_{IN}$-$V_{OUT}$) information to adjust the gain of forward path 410, whereas adaptive gain circuitry 422 uses the current per leg ($I_{unit}$) information ($I_{unit}$ is current per leg in transistor bank 113 in FIG. 1) to adjust the gain of forward path 420. The dependency of $AG_2$ (adaptive gain multiplier factor) on $I_{unit}$ may be seen only at lower dropouts where $I_{unit}$ falls.

As shown in FIG. 4, digital linear controller 130 can receive error_code_p and generate dlc_out (e.g., N-bit code). The value of dlc_out can also be based on feedback from nl_out (the output of non-linear controller 140 in FIG. 1) that can be selected by multiplexers 433 and 435 using signal nl_mode_en, as shown in FIG. 4. in operation, the value of dlc_out can be updated at each clock cycle, based on error_code_p, to control (e.g., turn on or turn off) the legs current paths 164 and 165) in the transistor bank 113 (FIG. 1). Output information dlc_out can also be fed back to adaptive gain circuitry 411 to adjust the gain based on current operating condition. Since the error code takes only a few known values (e.g., 0, +/−1, +/−2, +/−6), the coefficients multiplied by error_code_ can be stored (e.g., pre-programmed) and kept ready or used as inputs of a multiplexer, using the binary code information as the select line of the multiplexer. This avoids using an additional multiplier (or multipliers) in forward path 410 besides a multiplier used in adaptive gain circuitry 411 for adjusting DC as described herein. This helps voltage regulator 110 to run at a relatively high frequency (e.g., in range of hundreds of mega-hertz) with a relatively free of timing issues or negligible timing issues.

Adaptive Gain 1 (AG1) Derivation and Implementation

In the equations of $AG_1$ and $AG_2$ as mentioned above, both $I_{unit}$ (current per leg) and $R_{eq}$ (which is $R_L \| R_o/N$) can vary. $I_{unit}$ depends on the dropout because current per leg falls at lower dropouts. Thus, $I_{unit}$ may be adjusted only in the low dropout range. However, $R_{eq}$ can vary significantly with load resistance $R_L$ and output resistance $R_o$ of transistor hank 113. Output resistance $R_o$ can vary with dropout especially for dropouts in the middle range (e.g., 100 mV to 400 mV) when transistor bank 113 operates in mostly linear region and not in saturation. Thus, $AG_1$ may need to be re-computed and refreshed each clock cycle.

$$I_{unit} R_{eq} = I_{unit}(R_L \| R_o/N)$$

$$I_{unit} R_{eq} = I_{unit}\left(\frac{R_L(R_o/N)}{(R_L + R_o/N)}\right) \text{ since}$$

$$R_L = \frac{V_{nom}}{N \cdot I_{unit}} \text{ for small droops/overshoots,}$$

$$I_{unit} R_{eq} = I_{unit} \cdot \left(\frac{V_{nom} \cdot R_o}{N \cdot (V_{nom} + I_{unit} R_o)}\right)$$

$$\frac{1}{I_{unit} R_{eq}} = N \cdot \frac{(V_{nom} + I_{unit} \cdot R_o)}{I_{unit} \cdot V_{nom} \cdot R_o} => AG_1 \frac{G_{setpoint}}{I_{unit} R_{eq}} =$$

$$N \cdot G_{setpoint} \cdot \left(\frac{1}{V_{nom}} + \frac{1}{I_{unit} \cdot R_o}\right) \text{ for higher dropouts}$$

dropouts <100 mV, the transistors of transistor bank 113 can behave as a resistor and $I_{unit}$ can vary with dropout. Thus, the above equation can be re-written as shown below.

$$=> AG_1 = \frac{G_{setpoint}}{I_{unit} R_{eq}} = N \cdot G_{setpoint} \cdot \left(\frac{1}{V_{nom}} + \frac{1}{V_{dropout}}\right) \text{ for lower dropouts}$$

where, $V_{nom}$ can be a target output voltage (e.g., target $V_{OUT}$) known from a target information VID_code (digital information corresponding to $V_{nom}$). $I_{unit}*R_o$ is mostly a constant for a given dropout voltage and can be fed from a look-up table with respect to dropout. The value of $V_{dropout}$ can be computed in digital value from known information VIN_code (digital information corresponding to $V_{IN}$) and VID_code, such that digital value of $V_{dropout}$=VIN_code−VID_code. The varying load current is indirectly represented by control_code (e.g., N) of the previous cycle (since control_code=dlc_out in the linear mode, control_code of the previous cycle=dlc_out of the previous cycle), and $V_{nom}$, '$I_{unit}.R_o$', and $V_{dropout}$ are available in digital code.

Figure 5A:
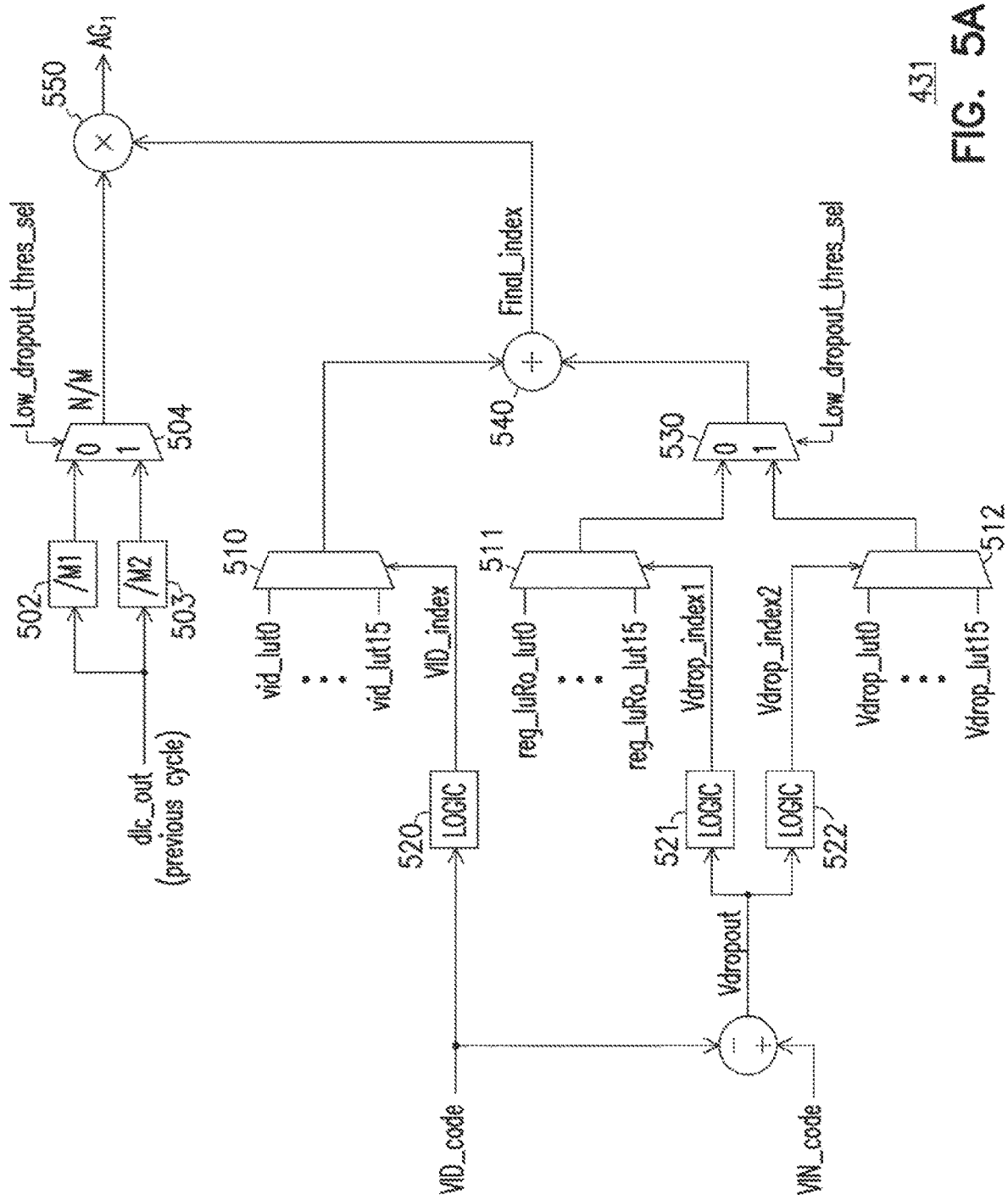
FIG. 5A shows a diagram of adaptive gain circuitry of the digital linear controller of FIG. 4, according to some embodiments described herein.

FIG. 5A shows a diagram of adaptive gain circuitry 411 of FIG. 4, according to some embodiments described herein. As shown in FIG. 5A, $AG_1$ (adaptive gain multiplier factor) can be computed as a function of dlc_out from the previous cycle, making it adaptive to the load current. For example, if dlc_out is an N-bit code (where N is the number bits), then dlc_out from the previous cycle can be provided by the value of the N bits from previous cycle.

As shown in FIG. 5A, dlc_out can be divided by factors M1 (where $M1=1/G_{setpint}$) and M2 (where $M2=1/N_{setpint}$). Dividers 502 and 503 (e.g., using shift right registers as dividers) can be used to divided dlc_out from the previous cycle. A multiplexer 504 can be used to select (based on signal Low_dropout_thres_sel) the output of dividers 502 and 503 as information N/M. Divide factors M1 and M2 can be chosen to be power of 2 to realize the divider using a shifter. Using a multiplier 550 (FIG. 5B), information NAM is then provided as input information to be multiplied by a gain factor selected using a final index, which is computed based on VID_code ($V_{nom}$) and $V_{dropout}$ information, as described below. As described above, $V_{nom}$ is a target output voltage known from a target VID_code, '$I_{unit}.R_o$' is mostly a constant for a given dropout voltage and can be fed from a look-up table with respect to dropout, and $V_{dropout}$ can be computed in digital value from known VIN_code ($V_{IN}$) and VID_code ($V_{nom}$, which is a target $V_{OUT}$)

Figure 5B:
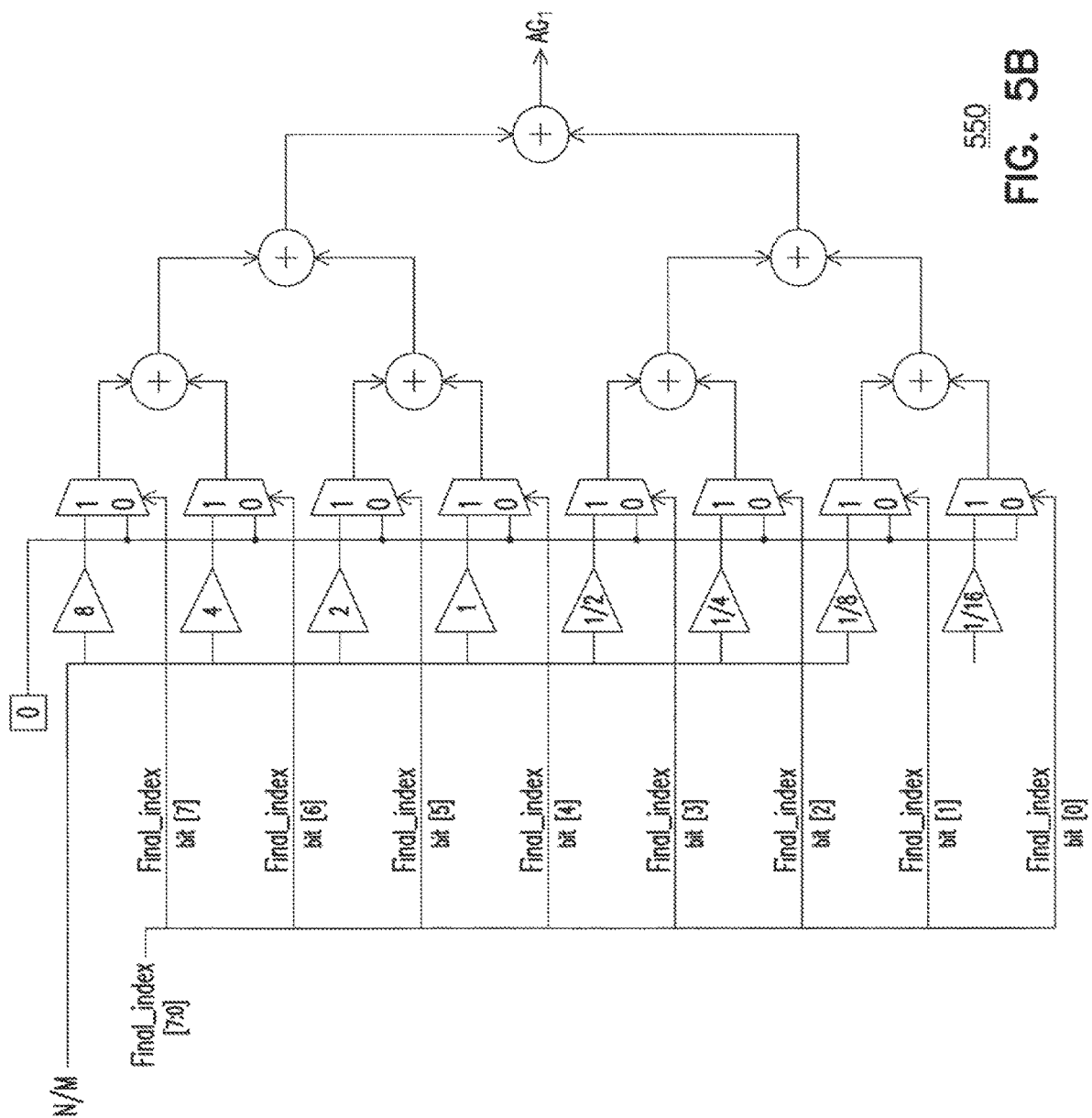
FIG. 5B shows a multiplier of the adaptive gain circuitry of FIG. 5A, according to some embodiments described herein.

FIG. 5B shows multiplier 550 of adaptive gain circuitry 411 of FIG. 5A, according to some embodiments described herein. As shown in FIG. 5B, the gain factor multiplication using final_index (e.g., eight bits [7:0] final_index can be done using shift-and-add logic on top of output code NIM (from FIG. 5A) to avoid using an outright multiplier(s)/divider(s). The shift-and-add logic in FIG. 5B has the form $2^3*x(7)+2^2*x(6)+2^1*x(5)+2^0*x(4)+2^{-1}*x(3)+2^{-2}*x(2)+2^{-3}*x(1)+2^{-4}*x(0)$ where x is based on the bits from the final index.

Final Index Computation

Referring again to FIG. 5A, a look-up table based implementation can be used to compute the index for $AG_1$ (adaptive gain multiplier factor) instead of real arithmetic computation.

The value of $$\frac{1}{V_{nom}}$$

can be stored as a fixed look-up table 'vid_lut' for the target $V_{nom}$ range (e.g., 0.5V to 1.13V) and can be divided into a number of equal sub-ranges. For example, as shown in FIG. 5A, 'vid_lut' can be divided into 16 values vid_lut0 through vid_lut15, which can be provided as inputs of a multiplexer 510.

The value of $$\frac{1}{I_{unit} \cdot R_o}$$

can be stored in a programmable look-up table 'reg_IuRo_lut' and can be divided into a number of sub-ranges. For example, as shown in FIG. 5A, 'reg_IuRo_lut' can be divided into 16 values reg_IuRo_lut0 through reg_IuRo_lut15, which can be provided as inputs of a multiplexer 511. Values reg_IuRo_lut0 through reg_IuRo_lut15 can be selected based on current voltage dropout, with higher resolution in the middle dropout region where it varies the most (e.g., 100 mV to 400 mV dropout range) in resolution of 20 mV-40 mV, for example. The look-up table for $$\frac{1}{I_{unit} \cdot R_o}$$

can be programmed based on known output resistance Ro, which may vary with skew, and known measured $I_{unit}$ information.

The $$\frac{1}{V_{dropout}}$$

value can also be stored as a fixed look-up table 'vdrop_lut' with respect to dropout information available from $V_{dropout}$ information. For example, as shown in FIG. 5A, $$\frac{1}{V_{dropout}}$$

can be divided into 16 values vdrop_lut0 through vdrop_lut15, which can be provided as inputs of a multiplexer 512. As described above, $V_{dropout}=V_{IN}-V_{OUT}$ (which is based on $V_{nom}$, and $V_{nom}$ is based on VID_code). Thus, in FIG. 5A, the digital value of $V_{dropout}$ can be obtained based on a subtraction of VID_code (e.g., $V_{nom}$) code from VIN_code (e.g., $V_{IN}$). Hence, the digital value of $V_{dropout}$=VIN_code−VID_code.

This value may be stored only in the region of low dropout (e.g., in 10 mV resolution).

In operation, $$\frac{1}{V_{nom}}$$

value is normally used (e.g., always used) and is selected by logic circuit 520 using signal VID_index (based on VID_code).

However, logic circuits 521 and 522 (using Vdrop_index1 and Vdrop_index2, respectively) select either index value $$\frac{1}{I_{unit} \cdot R_o} \text{ or } \frac{1}{V_{dropout}}$$

based on Vdropout (e.g., low dropout or high dropout). As shown in FIG. 5A, a multiplexer 530 can use signal low_dropout_thres_sel to select between $$\frac{1}{I_{unit} \cdot R_o} \text{ and } \frac{1}{V_{dropout}}$$

based on dropout as explained in the equations for AG above and shown in FIG. 5A. Signal low_dropout_thres_sel can be activated (e.g., from logic zero level to logic one level) if $V_{dropout}$<V_threshold (e.g., approximately 100 mV) or if current per leg $I_{unit}$ falls below a threshold (e.g., voltage regulator 110 enters low-dropout region). The selected look-up table value of either $$\frac{1}{I_{unit} \cdot R_o} \text{ or } \frac{1}{V_{dropout}}$$

(selected by low_dropout_thres_sel) is added (using adder 540) to the selected look-up table value $$\frac{1}{V_{nom}}$$

(selected by signal VID_index of logic circuit 520) to generate the final_index. The final_index is used for selecting the appropriate gain (as described above with reference to FIG. 5B) based on the operating point.

Digital linear controller 130 or control circuitry 125, or both, can include a memory circuit (e.g., registers or other types of memory, not shown) to store (e.g., program) the values (e.g., in the form of look-up table entries) of $$\frac{1}{V_{nom}}, \frac{1}{I_{unit} \cdot R_o}, \text{ and } \frac{1}{V_{dropout}}.$$

As described above, the value of the final_index is generated based on the values of $$\frac{1}{V_{nom}}, \frac{1}{I_{unit} \cdot R_o}, \text{ and } \frac{1}{V_{dropout}}.$$

Thus, the value of the final_index is based on values stored in the memory circuit of digital linear controller 130 or control circuitry 125, or both.

the value of $$\frac{1}{V_{nom}}$$

can sometimes ignored. For example, $$\frac{1}{V_{nom}}$$

can be ignored in a lower dropout region due a much lower contribution to the gain from $$\frac{1}{V_{nom}}$$

relative to that of $$\frac{1}{V_{dropout}}.$$

However, at a certain dropout (e.g., a relatively high dropout)

$$\frac{1}{V_{nom}}$$

can start to dominate, with small or negligible contribution from $$\frac{1}{I_{unit} \cdot R_o},$$

because output resistance Ro generally increases at higher dropouts (e.g., in some technology nodes).

The above description discusses techniques for computation and implementation of adaptive gain circuitry 411 to compute $AG_1$ (adaptive gain multiplier factor) of FIG. 4. Similar techniques can be used for implementing adaptive gain circuitry 422 (i.e., $AG_2$—adaptive gain multiplier factor) in forward path 420.

Figure 6:
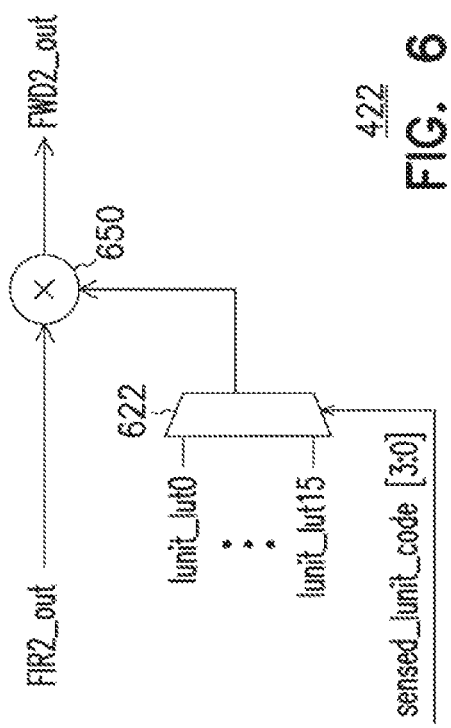
FIG. 6 shows a diagram of another adaptive gain circuitry of the digital linear controller of FIG. 4, according to some embodiments described herein.

FIG. 6 shows a diagram of adaptive gain circuitry 422 of digital linear controller 130 of FIG. 4, according to some embodiments described herein. In FIG. 6, the structure of multiplier 650 of adaptive gain circuitry 422 of forward path 420 can similar to (or the same as) the structure of multiplier 550 of FIG. 5B. As shown in FIG. 6, the value of $$\frac{I_{unit\_set}}{I_{unit}}$$

can be stored in a look-up table 'Iunit_lut", which can include different selectable values. For example, 'Iunit_lut' can include 16 values Iunit_lut0 through Iunit_lut15, which can be provided as inputs of a multiplexer 622. Values Iunit_lut0 through Iunit_lut15 can be appropriately selected using information sensed_Iunit_code (e.g., four bits [3:0] code). The value of sensed_Iunit_code can be based on dynamic $I_{unit}$ information from the current sense logic (not shown) for the power gates used for telemetry purposes. The R_eq (which is R1||Ro/N) at set-point is consumed in the coefficient terms associated with forward path 420 to make the term AG2 (Adaptive Gain 2) only dependent on the ratio of current per leg at set-point to the current per leg at the operating point that may vary mainly at lower dropouts. As shown in FIG. 6, multiplier 650 can generate information FWD_out based on the product (multiplication) of one of values Iunit_lut0 through Iunit_lut15 (selected to output of multiplexer 622) and information FIR2_out (from FIR filter of forward path 420 in FIG. 4). Information FWD_out can be added to information from forward path 410, as described above with reference to FIG. 4.

Thus, as described above with reference to FIG. 1 through FIG. 6, the linear control techniques in voltage regulator 110 can cancel the load-dependent varying dominant pole and varying DC gain of the plant with a corresponding zero and a new adaptive DC gain adjustment technique. The described techniques are applicable to different load conditions and are not to be limited to a specific load condition. This means that voltage regulator 110 dynamically adjusts itself to counter the change that happens to the plant at different load conditions over time. Thus, the described linear control techniques help improve closed-loop performance in terms of fast and stable response, and reduced peak droop, over-shoot, or both, across a wide range of current load and a wide output voltage range. The described linear control techniques also allow a single set of coefficients to be used for the digital filter across a wide operating range of voltage regulator 110 for different load conditions. All of these factors allow the described linear control techniques to have improvements over some conventional techniques.

For example, as mentioned above, some conventional linear control techniques are design for the worst-case condition at a specific output voltage and load condition. If such specific load condition is altered, it may result in degraded performance, slow response time, higher droop/over-shoot due to low bandwidth. Such conventional technique may handle a relatively small range of load current with one set of coefficients.

In the techniques described herein, voltage regulator 110 uses a single set of coefficients for a much wider range of load current, input voltage range and load capacitance. Further, the performance of the loop in the described technique may remain relatively unchanged over the range in terms of stability and loop bandwidth, which results in better transient response in terms of worst-case droop and settling time.

Non-Linear Control Techniques

As described above with reference to FIG. 1, control circuitry 125 (FIG. enters the non-linear mode when an error (e.g., a droop or an over-shoot event) is detected at $V_{OUT}$. In the non-linear control techniques described herein, non-linear controller 140 uses output information nl_out (digital non-linear output code) to perform a non-linear correction to correct an error in $V_{OUT}$ in two stages, an initial stage and a subsequent stage. The computation for nl_out is different from the initial stage and the subsequent stage. In the non-linear control techniques described herein, non-linear controller 140 computes (e.g., pre-computes) correction information nl_dlc_step while $V_{OUT}$ is still within a target value range (before $V_{OUT}$ crosses a non-linear target threshold). This allows non-linear controller 140 to quickly correct $V_{OUT}$ as soon as (e.g., in half cycle of clock signal Fclk) $V_{OUT}$ is detected to be outside the target value range. Non-linear controller 140 also computes (e.g., pre-computes) the value of correction information nl_dlc_step based on operating conditions at that time, such that non-linear controller 140 can smoothly and accurately correct an error in $V_{OUT}$ to avoid over-correction or under-correction.

As part of the operation of computing nl_dlc_step, non-linear controller 140 counts the number of clock edges (positive and negative edges) that the error code (e.g., generated based on error_code_p and error_code_n) is outside a zero error zone and before the value of $V_{OUT}$ crosses the non-linear entry threshold (e.g., +4 for droop event and −4 for the over-shoot event). The value of the count value is used in a non-linear entry time computation. Correction information nl_dlc_step is computed based on the computed non-linear entry time computation. Then, non-linear controller 140 uses the computed nl_dlc_step to compute nl_out and have nl_out ready for use in the initial stage after an error in $V_{OUT}$ is detected, After the initial stage, non-linear controller 140 uses a different computation for nl_out in the subsequent stage and continues to correct the error in $V_{OUT}$ until $V_{OUT}$ returns to the target value range, at which non-linear controller 140 exits the non-linear mode and hands over the operation to digital linear controller 130.

The following description discusses computation of correction information nl_dlc_step, which is used for the computation of nl_out (digital non-linear output code) for the initial stage of correcting error $V_{OUT}$ at entry of the non-linear mode.

The values (initial values) of nl_out to be used in the initial stage of correcting error (e.g., a droop or an over-shoot) in $V_{OUT}$ are computed based on the equations below.

nl_out=dlc_out (previous cycle)+nl_dlc_step (for droop)

nl_out=dlc_out (previous cycle)−nl_dlc_step (for over-shoot)

FIG. 7 shows an example waveform of voltage $V_{OUT}$ and current $I_{LOAD}$ during an example droop event, according to some embodiments described herein. FIG. 7 also shows an example of the effect of propagation delay on the droop, and the time at which droop correction starts. Current $I_{LOAD}$ can have an initial value (shown as "INITIAL LOAD" in FIG. 7) and a final value (shown as "FINAL LOAD" in FIG. 7). As mentioned above, non-linear controller 140 uses a count of the number of clock edges (positive and negative edges) as part of the operation of computing correction information nl_dlc_step. In FIG. 7, the 'count' can be set (or reset) at time $T_{RS1}$. Then, 'count' can start at time $T_C$ with count=1 and continue (e.g., sequentially increases) until it is reset (e.g., at time $T_{RS2}$) to count=0. For simplicity, only a few values (e.g., count=0, 1, 2) of 'count' are shown in FIG. 7.

In the example of FIG. 7, target value range 714 is an example target value range of voltage $V_{OUT}$. In this example, target value range 714 is assumed to be between an upper target value 714U and a lower target value 714L. Upper target value 714U can correspond to ADC error=−4 (e.g., +40 mV). Lower target value 714L, can correspond to ADC error=+4 (e.g., −40 mV). The nl_entry_threshold is assumed to be at ADC error=+4 (e.g., lower target value 714L). Thus, in this example, if the value of voltage $V_{OUT}$ is detected to be less than its target value by 40 mV (e.g., a droop occurs) or greater than its target value by 40 mV (e.g., an over-shoot occurs), then the non-linear mode is entered, and non-linear controller 140 can start correcting the error (e.g., droop or over-shoot) in $V_{OUT}$. In FIG. 7, zero error zone 710 indicates a zone (range) where $V_{OUT}$ is deemed to be free of error (zero error or close to zero error). Thus, in this example, if the value of voltage $V_{OUT}$ is detected to be lower than (or higher than) a target value by less than 10 mV, the linear mode is maintained (e.g., non-linear mode is not entered) and digital linear controller 130 (FIG. 1) remains to operate in controlling the value of $V_{OUT}$.

Time Computation from Start of Load Step to Application of Non-Linear Correction In the following discussion, Ts is the period (e.g., 2.5 ns) of clock signal Fclk (FIG. 1 and FIG. 2) that is used by ADC 120 to sample errors in voltage $V_{OUT}$. Samples for non-linear logic in non-linear controller 140 can be obtained at each half cycle (half period or Ts/2) based on the positive and negative edges of clock signal Fclk.

T_nlentry=Ts/2+(count+1)*(Ts/2), where T_nlentry is the time (e.g., at time T2 in FIG. 7) to non-linear entry after a load step starts (e.g., at time T0), and count is the value of the count at taken at the time (e.g., time T1) that is a half cycle of clock signal Fclk before the time (e.g., time T2) that the non-linear entry threshold crossing is detected. Thus, in the example of FIG. 7, the count used in equations (e.g., T_nlentry and Tstart_recovery (below)) for timing computation is count=2 (as shown in FIG. 7 at time T1). However, the value of a count can vary based on di/dt of the load step. For example, at the time that is a half cycle of clock signal Fclk, before the time that the non-linear entry threshold crossing is detected, the value of the count can be less than two (e.g., if the load step is fast) or more than two (e.g., if the load step is slow). In the description here, the cycle refers to the cycle of clock signal Fclk (sampling clock signal).

In the example of FIG. 7, T_nlentry=Ts/2 (count+1)*(Ts/2)=Ts/2+(2+1)*(Ts/2)=Ts/2+3*(Ts/2)=4*(Ts/2). This means that T_nlentry is four half cycles after time T0 (load step start time), which is at time T2, as shown in FIG. 7.

Tstart_recovery=T_nlentry+Ts/2 (here, Ts/2 is added because of propagation delay from ADC output at non-linear entry), where Tstart_recovery is the time that correction starts after a load step is applied (e.g., at time T0 in FIG. 7).

Based on the above, $$T\text{start\_recovery}=(\text{count}+3)*(Ts/2) \quad \text{(Eq. 1)}$$

Thus, in the example of FIG. 7, Tstart_recovery=3)*(Ts/2)=5*(Ts/2). This means that Tstart_recovery is five half cycles after time T0 (load step start time), which is at time T2, as shown in FIG. 7.

The non-linear correction described herein applies correction information nl_dlc_step (included in nl_out) in order to provide (e.g., source) enough current in the immediate half cycle (Ts/2) after recovery starts. The applied current would give a delta voltage (e.g., deltaV) rise greater than delta voltage droop that would happen if non-linear correction were not applied, and the load current had continued to increase at the same di/dt rate for that cycle. This prevents the droop from dropping further because the voltage (e.g., deltaV) is computed with an expectation to cause voltage $V_{OUT}$ to recovery immediately. For this reason, di/dt of the load and the voltage error at non-linear entry can be determined, such that correction information nl_dlc_step satisfies the criteria described above.

For example, assuming that 'deltaV' is the additional droop possible in half cycle if non-linear correction were not applied, in order to prevent voltage $V_{OUT}$ from dropping further in the immediate next half cycle, the same amount of charge (based on deltaV) can be replenished in the immediate next half cycle. This allows voltage $V_{OUT}$ to start recovery (e.g., start to return to the target value range) in the immediate next half cycle after an error in $V_{OUT}$ is detected (e.g., after non-linear entry is detected). The computation for 'delta.' and 'nl_dlc_step' is as follows.

Based on I=C*dv/dt, then nl_dlc_step*I_per_leg=C_load*deltaV/(Ts/2)

$$\text{nl\_dlc\_step}=(C_{load}/\text{I\_per\_leg})*(2/Ts)*\text{deltaV} \quad \text{(Eq. 2)}$$

where $C_{load}$ is the total load capacitance seen at the output, I_per_leg is the fixed current per leg of transistor bank 113 (FIG. 1), and 'delta' computation is shown below.

deltaV=integral($I_{LOAD}$*dt)/$C_{load}$ between Tstart_recovery (e.g., time T3 in FIG. 7) to Tstart_recovery+Ts/2 (e.g., time T4 in FIG. 7).

By computing the area under $I_{LOAD}$ curve between the above two time instants (e.g., between times T3 and T4) with approximation and substituting Tstart_recovery from Eq. 1, 'deltaV' can be obtained as follows.

$$\text{deltaV}=\text{delta\_Ih}*(\text{count}+3)*(Ts/2)/C_{load} \quad \text{(Eq. 3)}$$

where delta_Ih is the change in load current in half cycle for the linear load step. The value for delta_Ih can be computed as shown below.

In the following description, droop_at_entry is the voltage droop at non-linear entry point (e.g., at time T2 in FIG. 7) at which an error in $V_{OUT}$ is detected. The value of droop_at_entry is approximately known from nl_error_at_entry (which is sampled ADC error at entry) and the known ADC resolution which is also known (e.g., a fixed voltage value (e.g., 0.01V).

There may be additional droop compared with 'nl_error_at_entry' sampled for faster load transients (e.g., when 'count' has a lower value). The accuracy of the 'nl_error_at_entry' (e.g., how close nl_error_at_entry is to the actual voltage droop) can be improved when the load step is slow (e.g., when 'count' has higher value) because voltage $V_{OUT}$ takes more time to cross non-linear entry threshold (nl_entry_threshold) than the time it takes for $V_{OUT}$ to cross non-linear entry threshold in the case when the load step is fast. Based on these relationships, the voltage droop at entry can be accurately determined as a function of 'count' and 'nl_error_at_entry'. The accuracy can be improved further if a relatively higher number of samples (e.g., four or more) is taken in one ADC clock period (e.g., period of clock signal Fclk), or if the number of comparators in ADC 220 (FIG. 2) is increased.

The following equations can be used to compute voltage droop at entry (droop_at_entry) that is based on the function of 'count' and 'nl_error_at_entry'.

nl_err_entry_adj=nl_error_at_entry+1 (for count <=3)
nl_err_entry_adj=nl_error_at_entry (for count >3 and <=5)
nl_err_entry_adj=nl_error_at_entry−1 (for count >5)

where 'nl_error_at_entry' is the magnitude of error code at non-linear entry. As an example, nl_error_at_entry' can be 4 or 6, and the non-linear entry threshold can be 40 mV error (for example).

droop_at_entry=nl_err_entry_adj*0.01=integral $(I_{LOAD}*dt)/C_{load}$ from t=0 (e.g., time T0) to T_nlentry (e.g., time T2)

Assuming linear change in load current and computing area under $I_{LOAD}$ curve gives, droop_at_entry=$(1/C_{load})*(½)$ *T_nlentry*delta_Ih*T_nlentry/(Ts/2)

After substituting 'T_nlentry' it gives, $$\text{delta\_Ih} = 4*C\_load*fs*0.01*nl\_err\_entry\_adj/[(count+2)\hat{}2] \quad (Eq. 4)$$

where fs=1/Ts (which is the sampling clock frequency)

Combining equations 2, 3 and 4, the value of correction information nl_dlc_step (e.g., the final controller step half cycle before non-linear entry is detected) that can be applied in the non-linear mode is as follows.

$$\text{nl\_dlc\_step}=(0.04*C_{load}*fs/I\_per\_leg)*nl\_err\_entry\_adj*(count+3)/[(count+2)\hat{}2] \quad (Eq. 5)$$

As described above, nl_dlc_step is the correction information that non-linear controller 140 uses to compute (e.g., pre-compute) the value of nl_out to be used (e.g., to adjust control code) in the initial stage of the non-linear correction after voltage $V_{OUT}$ is detected as being outside the target value range.

Non-linear Controller Implementation

FIG, 8 shows a simplified architecture diagram of non-linear controller 140 of FIG. 1, according to some embodiments described herein. For implementation, the above equation 5 for correction information nl_dlc_step can be re-written as shown below, $$\text{nl\_dlc\_step}=K\_fixed*K\_count \quad (Eq. 6)$$

where K_fixed=(0.04*C_load*fs/I_per_leg), can be a programmable value (shown as an example 10-bit reg_K_fixed [0:9] in FIG. 8) based on actual measured (known) values of load capacitance $C_{load}$, I_per_leg is the current per leg of transistor bank 113 (FIG. 1), and 'fs' is the sampling frequency (e.g., the frequency of clock signal Fclk, Non-linear controller 140 or control circuitry 125, or both, can include a memory circuit (e.g., registers or other types of memory, not shown) to store (e.g., program) the value of K_fixed (the value represented by 10-bit_reg_K_fixed in FIG. 8).

K_count=nl_err_entry_adj*(count+3)/[(count+2)^2], which can be implemented as a look-up table based on 'count' for nl_error_at_entry=4. In wide-range load scenario, the value of 'count' (FIG. 7) may vary. For example, 'count' may vary between 0 and 9. Thus, in this example, the look-up table can include 10 different entries (values) for 'K_count', such as count values (e.g., reg_Kcount_val0 through reg_Kount_val9, each having an example of eight bits [7:0], as shown in FIG. 8), which can be provided as inputs to multiplexer 810. Non-linear controller 140 or control circuitry 125, or both, can include a memory circuit (e.g., registers or other types of memory, not shown) to store (e.g., program) the values of K_count (e.g., reg_Kcount_val0 through reg_Kount_val9) that can be different selectable values.

During operation of non-linear controller 140, count measurement logic circuitry 805 (FIG. 8) can generate count information 'Kcount_meas_sel' to select an appropriate 'K_count' value among the stored count values from the look-up table. Depending on the value of 'Kcount_meas_sel', multiplexer 810 can select one of reg_Kcount_val0 through reg_Kcount_val9 to be a selected 'K_count' (called 'K_count_selected'). 'K_count_selected' is multiplied with reg_K_fixed (which corresponds to 'K_fixed' in equation 6) by a multiplier 812 to generate correction information nl_dlc_step.

As shown in FIG. 8, 'K_count' (which is one of reg_Kcount_val0 through reg_Kount_val9) can be adjusted by 1.5 times (e.g., can be multiplied by 1.5 by circuit 814) for cases when nl_error_at_entry=6, before applying correction information nl_dlc_step to the output of non-linear controller 140.

Non-linear controller 140 can use signal nl_error_at_entry_sel to cause a multiplexer 816 to either select nl_dlc_step=reg_K_fixed*K_count_selected (e.g., if nl_error_at_entry=4) or select nl_dlc_step=reg_K_fixed*K_count_selected*1.5 (e.g., if nl_error_at_entry=6). As described above, 'K_count_selected' is one of reg_Kcount_val0 through reg_Kount_val9 that is selected based on the value of 'K_count_meas_sel'.

FIG. 9 shows a block diagram of count measurement logic circuitry 805 of FIG. 8 used to generate the value for 'Kcount_meas_sel', according to some embodiments described herein. As shown in FIG. 9, count measurement logic circuitry 805 can include modules 911 and 912, and an adder 923 to generate 'Kcount_meas_sel' based on error information pos_error_code and neg_error_code, and signals nl_mode_en and nl_exit. As described above, 'Kcount_meas_sel' corresponds to 'count'. The value of 'Kcount_meas_sel' determines how many clock edges (positive and negative) occur from the time (e.g., time T2 in FIG. 7) that $V_{OUT}$ is outside zero error zone 710 to time (e.g., time T2) that the value reaches the non-linear entry threshold (e.g., the time at which $V_{OUT}$ is outside target value range 714 in FIG. 7). In FIG. 9, module 911 can include a positive edge counting logic 911a to count the number of the positive edges of clock signal Fclk. Module 912 can include a negative edge counting logic 912a to count the number of the negative edges of dock signal Fclk. Adder 923 can operate to add the count values from modules 911 and 912 to generate 'Kcount_meas_sel'.

In operation, based on error codes pos_error_code and neg_error_code and ADC error levels (e.g., FIG. 7), count measurement logic circuitry 805 of FIG. 9 can start counting when $V_{OUT}$ is outside zero error zone (e.g., zero error zone 710 in FIG. 7) and stop counting, and then reset the count, when $V_{OUT}$ is inside the zero error. For example, using the example of FIG. 7, count measurement logic circuitry 805 can set (or reset) the 'count' (es., at time $T_{RS1}$) such that count=0 when the value of $V_{OUT}$ is within zero error zone 710. Count measurement logic circuitry 805 can start counting, count=1, right after at time $T_C$) the time that $V_{OUT}$ is outside zero error zone 710. Count measurement logic circuitry 805 can stop and reset the count (e.g., count=0 at time $T_{RS2}$ in FIG. 7) when the value of $V_{OUT}$ is again within zero error zone 710 (e.g., a half cycle after the non-linear mode is exited). In FIG. 9, one or both of signals nl_mode_en and nl_exit can also be used in addition to error codes pos_error_code and neg_error_code to generate 'Kcount_meas_sel'. For example, signal nl_mode_en can be used to start and stop the count, and signal nl_exit can be used to reset the count.

Referring again to FIG. 8, after computation of correction information nl_dlc_step based on the multiplication of K_fixed (a fixed value) with K_count (one of reg_Kcount_val0 through reg_Kount_val9 selected based on 'Kcount_meas_sel'), nl_dlc_step can be combined with (either added to or subtracted from) dlc_out to provide nl_out. This pre-computed nl_out can be ready a half cycle before an error (e.g., a droop or an over-shoot) in $V_{OUT}$ is detected.

In FIG. 8, label "for Droop" indicates an operation to compute nl_out to prepare to correct a droop in $V_{OUT}$. Adder 822 can add nl_dlc_step to dlc_out from a previous cycle. The result (nl_out=dlc_out+nl_dlc_step) can be available (e.g., stored in positive and negative edge-triggered flip-flops (+ve and −ve FF) 823 and 824) before entry of the non-linear mode.

The label "for Over-shoot" in FIG. 8 indicates an operation to compute nl_out to prepare to correct an over-shoot in $V_{OUT}$. Subtractor 832 can subtract nl_dlc_step from dlc_out from a previous cycle. The result (nl_out=dlc_out−nl_dlc_step) can be available (e.g., stored in positive and negative edge-triggered flip-flops (+ve FF and −ve FF) 833 and 834) before entry of the non-linear mode.

Clock signal Fclk can be used to trigger flip-flops 823, 824, 833, and 834. Saturation monitors (SAT) 825 and 835 can be used to keep the values of pre-computed nl_out (nl_out='dlc_out'+'nl_dlc_step', and nl_out='dlc_out'−'nl_dlc_step', respectively), within saturation limits. The pre-computed nl_out can be used to adjust control_code during the initial stage (e.g., between times T3 and T4 in FIG. 7) of correcting $V_{OUT}$.

In the above description, count information Kcount_meas_sel (which is 'count' used to select count values reg_Kcount_val0 through reg_Kount_val9 is available a half cycle earlier than non-linear entry, which enables 'nl_dlc_step' after multiplication of K_count to K_fixed. Thus, at the time (e.g., time T3) 'nl_out' is applied in the correction of $V_{OUT}$ (after non-linear entry is detected), 'nl_out' is a pre-computed value in which nl_out=dlc_out_prev +/−nl_dlc_step (where dlc_out_prev is the previous value of dlc_out (e.g., at time T2)). This pre-computed value can be propagated as soon as non-linear entry threshold crossing is detected (e.g., at time T2 in FIG. 7) and 'nl_mode_en' is activated (e.g., changed to a logic one level). Along with threshold crossing, non-linear controller 140 can select the appropriate pre-computed nl_out (either nl_out=dlc_out+nl_dlc_step or nl_out=dlc_out−nl_dlc_step) based on the sign of the error at entry represented by signal 'entry_error_sign_bit' (to control multiplexer 842), non-linear entry clock edge signal 'entry_pos_or_neg_edge' (to control multiplexers 826 and 836), and non-linear error at entry (e.g., nl_error_at_entry=4 or 6). The structure of non-linear controller 140 is configured such that insignificant logic delay is added in the path besides the propagation delay from non-linear controller 140 to transistor bank 113 (FIG. 1).

As shown in FIG. 8, non-linear controller 140 can include a bubble correction 851 to improve the accuracy of error_code_p, and a thereto-to-binary converter 852 to perform a thermometric-to-binary conversion to convert bits [7:0] of information error_code_p into positive ADC error levels pos_error_code (e.g., 5 bits [4:0]). Non-linear controller 140 can include a bubble correction 861 to improve the accuracy of error_code_n, and a thereto-to-binary converter 862 to perform a thermometric-to-binary conversion to convert bits [7:0] of information error_code_n into positive ADC error levels neg_error_code (e.g., 5 bits [4:0]). Count measurement logic circuitry 805 (also shown in FIG. 9) to generate count information 'Kcount_meas_sel' (e.g., 4 bits [3:0]) that is used to select count values reg_Kcount_val0 through reg_Kount_val9.

As shown in FIG. 8, non-linear controller 140 can include an error threshold detector 872 to generate signal nl_mode_en (the non-linear mode enable signal) and nl_exit (non-linear exit signal) based one ADC error levels 'pos_error_code' and neg_error_code and nl_entry_threshold. Error threshold detector 872 can activate (e.g., provide a logic one level to) signal nl_mode_en when the value of $V_{OUT}$ crosses nl_entry_threshold (e.g., at time T2 in FIG. 7), which is when the value of $V_{OUT}$ is outside target value range 714 (FIG. 7). Error threshold detector 872 can activate (e.g., provide a logic one level to) signal nl_exit when the value of $V_{OUT}$ returns (e.g., at time T3 in FIG. 7) to target value range 714.

As shown in FIG. 8, the value of information pos_error_code can be multiplied by a scaling factor K2 and can be added (by adder 874) to the value of nl_out from the previous cycle. Non-linear controller 140 can include saturation monitors (SAT) 875 to keep the value of pos_error_code (after being multiplied by scaling factor K2) within saturation limits. Scaling factor K2 can be a factor smaller than 'nl_dlc_step' in order to apply fine steps and to avoid an over-shoot during recovery of $V_{OUT}$. Linear code nl_out is provided back to digital linear controller 130 (FIG. 1) to ensure smooth switching between modes at nl_exit before digital linear controller 130 settles to new 'dlc_out' code to maintain zero error in steady-state.

As shown in FIG. 8, non-linear controller 140 can include a multiplexer 876, which can be controlled by a signal State, to select the value for nl_out during the initial stage (e.g., an initial portion) and the subsequent stage (e.g., a subsequent portion) of the non-linear correction (described above. Signal State can be generated by a state machine (not shown) of voltage regulator 110. Signal State can be controlled such that it can have a signal level corresponding to logic zero (e.g., State=0) during the linear mode, and a signal level corresponding to logic one (e.g., State=1) at some time (e.g., at time T4 in FIG. 7) after entry of the non-linear mode. The value of nl_out relative to the value of signal State after entry of the non-linear mode (e.g., after time T2 in FIG. 7) is as follows.

State=0 (e.g., before time T3 in FIG. 7)
nl_out :=dlc_out+nl_dlc_step (if error in $V_{OUT}$ is a droop), or
nl_out=dlc_out−nl_dlc_step (if error in $V_{OUT}$ is an over-shoot)
State=1 (e.g., after time T3 in FIG. 7)
nl_out=nl_out_prev+K2*pos_error_code
where pos_error_code is based on error_code_p.

Thus, after entry of the non-linear mode and before signal State is activated to State=1, nl_out=dl_out+nl_dlc_step (if error in $V_{OUT}$ is a droop), or nl_out:=dlc_out−nl_dlc_step (if error in $V_{OUT}$ is an over-shoot). After State=1 (e.g., after time T4), 'nl_out' can be computed at each cycle of clock signal Fclk using the dynamic error code on positive edge (pos_error_code). After State=1, 'nl_out' code can be increments/decrements by K2*pos_error_code at each cycle until the value of $V_{OUT}$ returns (e.g., at time T5 in FIG, 7) to target value range 714, Error threshold detector 872 (FIG. 8) can activate signal nl_exit (e.g., provide a logic one level to) signal nl_exit to exit the non-linear mode after $V_{OUT}$ returns to target value range 714. Digital linear controller 130 (FIG, 1) can take over operation of controlling $V_{OUT}$. The process of linear and non-linear operations described repeats in order to keep $V_{OUT}$ in zero error zone 710 and within target value range 714.

The above description with reference to FIG. 7 through FIG. 9 shows that correction information nl_dlc_step can be dynamically pre-computed accurately by digitally extracting the rate of change in load current relative to time (di/dt) digitally. Thus, output information nl_out=dlc_out_prev +/−nl_dlc_step (at the time nl_out is applied (e.g., within half cycle) after detection of non-linear entry) is based on the pre-computed correction information nl_dlc_step, which is computed while $V_{OUT}$ is within the target value range and before an error (e.g., droop) is detected. As soon as error output crosses a programmable threshold (e.g., nl_entry_threshold in FIG. 7) at either the positive edge or negative edge of the sampling clock signal (clock signal Fclk) edge (due to dual-edge (positive-negative) operation), the pre-computed non-linear code nl_out is selected as control_code at output port 126 (FIG. 1). The control_code can adjust the number of turned-on legs (e.g., turned on additional legs) in transistor bank 113 with a relatively small propagation delay in the path (e.g., a delay of hundreds of pico-seconds in a worst case). Therefore, worst-case response time from output droop crossing a threshold (e.g., $V_{OUT}$−40 mV) to turning-on of additional legs can be relatively small.

Thus, as described above with reference to FIG. 7 through FIG. 9, during fast load transients, voltage regulator 110 enters the non-linear mode autonomously and switches back to the linear mode after the output voltage ($V_{OUT}$) recovers. The non-linear control techniques described herein digitally compute (e.g., pre-compute) the loss of charge or voltage droop that would happen if non-linear correction is not applied and the load current continued to rise at the same average rate. Then, the described techniques use the pre-computed information to determine the digital non-linear step that controls the transistors of transistor bank 113. This allows voltage regulator 110 to turn on enough legs to source an amount of current sufficient to add charge in the immediate next cycle. Applying the amount of current this way allows droop to recover instantaneously even if load current continues to increase for the next cycle at the same rate. This also prevents over-correcting, thereby avoiding over-shoots and oscillations. All of these factors al low the described non-linear control techniques to have improvements over some conventional techniques.

For example, as mentioned above, some conventional techniques apply fixed compensation to correct error caused by a droop, regardless of load variations. This can lead to over-correction and under-correction for a relatively wider range of load current and large current variation rate across an output voltage range.

In the non-linear techniques described herein, voltage regulator 110 provides a single modular reconfigurable solution to cover applications with a relatively wide range of load current and widely varying di/dt. This can be particularly useful for loads that have multiple functional units (e.g., processor cores in a multicore processor). The non-linear step gain can be programmable based on output load and power transistors (e.g., power FETs) that provide the output voltage. Further, the step is adaptive to the load di/dt because the load di/dt is digitally computed internally in the non-linear controller 140, thereby avoiding over-shoots or oscillations in non-linear response. The described techniques can also be used for varying specifications of the plant by fuse options apart from the internal adaptive control of a non-linear step without adding a significant delay.

Figure 10:
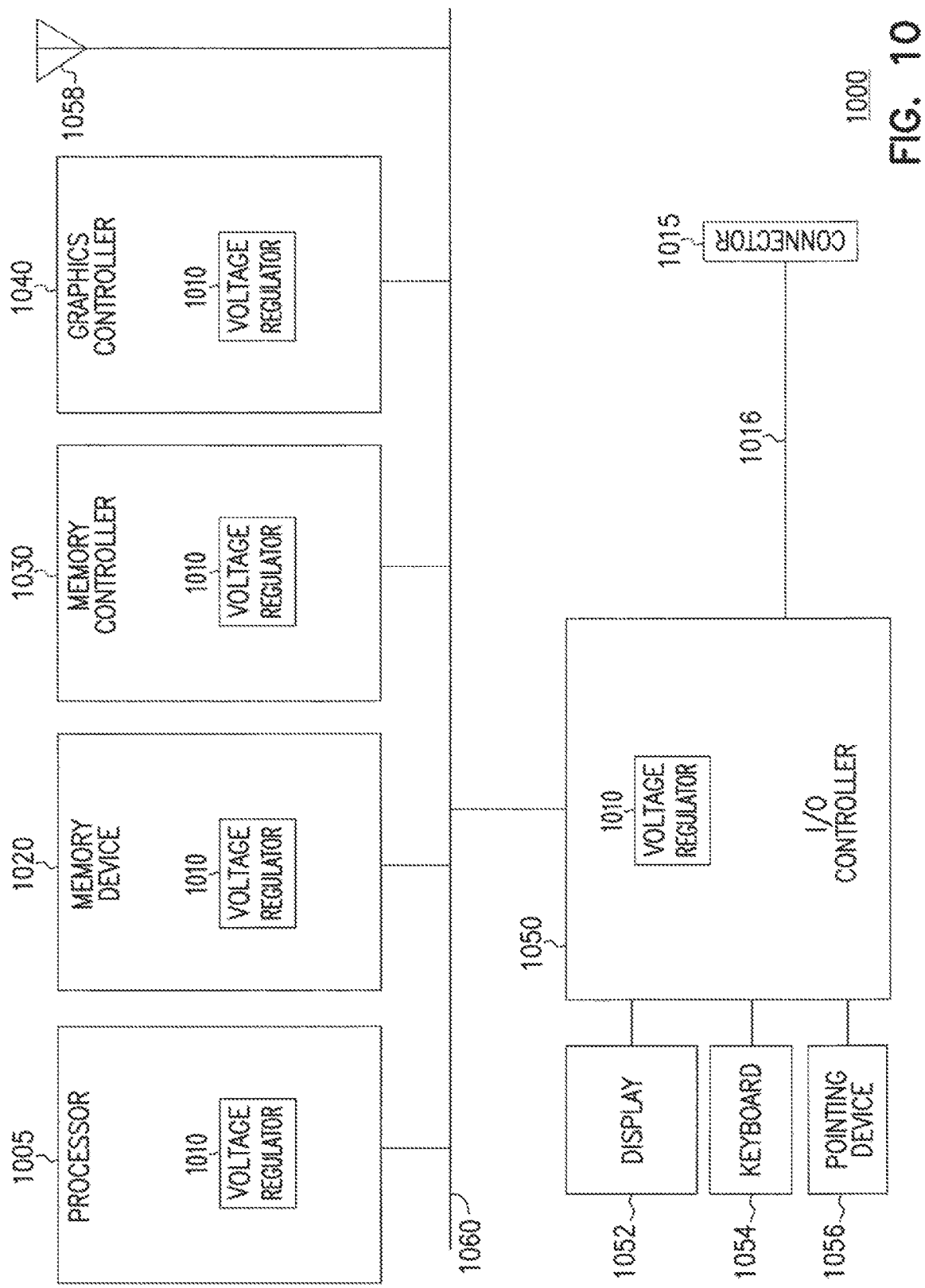
FIG. 10 shows an apparatus in the form of an electronic system, according to some embodiments described herein.

FIG. 10 shows an apparatus in the form of a system (e.g., electronic system) 1000, according to some embodiments described herein. System 1000 can include or be included in a computer, a tablet, or other electronic systems. As shown in FIG. 10, system 1000 can include a processor 1005, a memory device 1020, a memory controller 1030, a graphics controller 1040, an input/output (I/O) controller 1050, a display 1052, a keyboard 1054, a pointing device 1056, at least one antenna 1058, a connector 1015, and a bus 1060 (e.g., conductive lines formed on a circuit board (not shown) of system 1000).

Each of processor 1005, memory device 1020, memory controller 1030, graphics controller 1040, and I/O controller 1050 can include an IC chip.

In some arrangements, system 1000 does not have to include a display. Thus, display 1052 can be omitted from system 1000. In some arrangements, system 1000 does not have to include any antenna. Thus, antenna 1058 can be omitted from system 1000.

Processor 1005 can include a general-purpose processor or an ASIC. Processor 1005 can include a central processing unit (CPU).

Memory device 1020 can include a dynamic random access memory (DRAM) device, a static random access memory (SRAM) device, a flash memory device, phase change memory, a combination of these memory devices, or other types of memory. FIG. 10 shows an example where memory device 1020 is a stand-alone memory device separated from processor 1005. In an alternative arrangement, memory device 1020 and processor 1005 can be located on the same die. In such an alternative arrangement, memory device 1020 is an embedded memory in processor 1005, such as embedded DRAM (eDRAM), embedded SRAM (eSRAM), embedded flash memory, or another type of embedded memory.

Display 1052 can include a liquid crystal display (LCD), a touchscreen (e.g., capacitive or resistive touchscreen), or another type of display. Pointing device 1056 can include a mouse, a stylus, or another type of pointing device.

I/O controller 1050 can include a communication module for wired. or wireless communication (e.g., communication through one or more antennas 1058). Such wireless communication may include communication in accordance with WiFi. communication technique, Long Term Evolution Advanced (LTE-A) communication technique, or other communication techniques.

I/O controller 1050 can also include a module to allow system 1000 to communicate with other devices or systems in accordance with one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), Ethernet, and other specifications.

Connector 1015 can be arranged (e.g., can include terminals, such as pins) to allow system 1000 to be coupled to an external device (or system). This may allow system 1000 to communicate (e.g., exchange information) with such a device (or system) through connector 1015. Connector 1015 may be coupled to 110 controller 1050 through a connection 1016 (e.g., a bus).

Connector 1015, connection 1016, and at least a portion of bus 1060 can include elements (e.g., conductive terminals, conductive lines, or other conductive elements) that conform to at least one of USB, DP, HDMI, Thunderbolt, PCIe, Ethernet, and other specifications.

FIG. 10 shows the elements (e.g., devices and controllers) of system 1000 arranged separately from each other as an example. For example, each of processor 1005, memory device 1020, memory controller 1030, graphics controller 1040, and I/O controller 1050 can be located on a separate IC chip (e.g., separate semiconductor dies). In some arrangements, two or more elements (e.g., processor 1005, memory device 1020, graphics controller 1040, and I/O controller 1050) of system 1000 can be located on the same die (e.g., same IC chip) that can form a system-on-chip (SoC).

As shown in FIG. 10, each of processor 1005, memory device 1020, memory controller 1030, graphics controller 1040, and I/O controller 1050 can include a voltage regulator 1010. Voltage regulator 1010 can include voltage regulator 110, Thus, voltage regulator 1010 can employ linear and non-linear control techniques described above with reference to FIG. 1 through FIG. 9.

Figure 11:
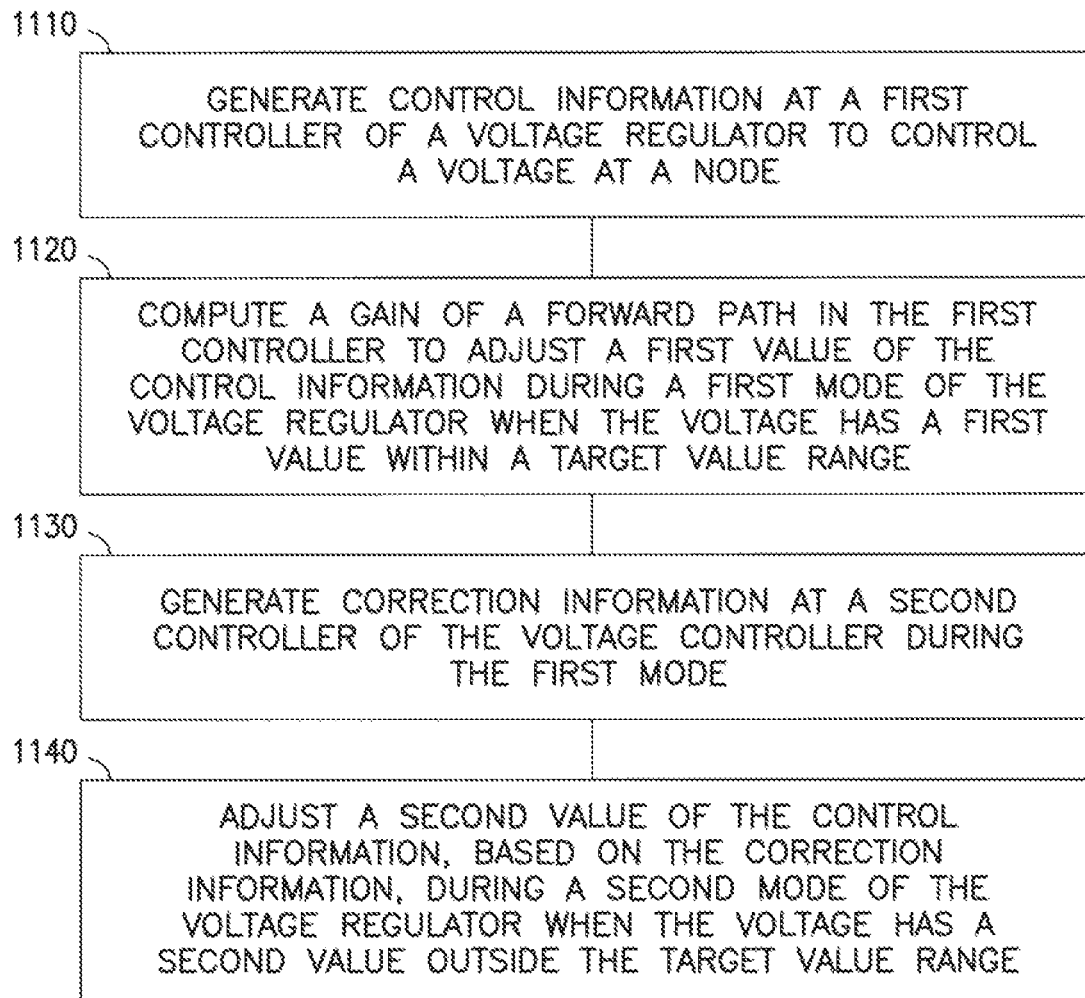
FIG. 11 is a flowchart showing a method of operating an apparatus, according to some embodiments described herein.

FIG. 11 is a flowchart showing a method 1100 of operating an apparatus, according to some embodiments described herein. The apparatus used in method 1100 can include any of the apparatuses (e.g., apparatus 100 and system 1000, including voltage regulators 110 and 1010) described above with reference to FIG. 1 through FIG. 10. Some of the activities in method 1100 may be performed by hardware, software, firmware, or any combination of hardware, software, and firmware. For example, some of the activities in method 1100 may be performed by hardware, software, firmware, or any combination of hardware, software, and firmware implemented in any of the apparatuses (e.g., apparatus 100 and system 1000, including voltage regulators 110 and 1010) described above with reference to FIG. 1 through FIG. 10.

As shown in FIG. 11, activity 1110 of method 1100 can include generating control information at a first controller of a voltage regulator to control a voltage at a node. Activity 1120 can include computing a gain of a forward path in the first controller to adjust a first value of the control information during a first mode of the voltage regulator when the voltage has a first value within a target value range. Activity 1130 can include generating correction information at a second controller of the voltage regulator during the first mode. Activity 1140 can include adjusting a second value of the control information, based on the correction information, during a second mode of the voltage regulator when the voltage has a second value outside the target value range.

Method 1100 can include fewer or more activities relative to activities 1110, 1120, 1130, and 1140 shown in FIG. 11, For example, method 1100 can include activities and operations of apparatus 100 and system 1000, including operations of voltage regulators 110 and 1010 described above with reference to FIG. 1 through FIG. 10.

The illustrations of the apparatuses and methods described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

ADDITIONAL NOTES AND EXAMPLES

Example 1 includes subject matter (such as a device, an electronic apparatus (e.g., circuit, electronic system, or both), or a machine) including an output to provide output information to control transistors of a power switching unit, a node to receive a feedback voltage based on an output voltage generated by the power switching unit, and a control circuitry to generate error information based on a value of the feedback voltage generated from the output voltage, generate the output information based on the error information provided to a forward path coupled to the output, and adjust a gain of the forward path based on a gain factor computed based at least in part on a first value of the output information during a first time interval in order to cause the output information to have a second value during a second time interval.

In Example 2, the subject matter of Example 1 may optionally include, wherein the control circuitry is to cause the output information to have the first and second values when the output voltage is within a target value range.

in Example 3, the subject matter of Example 1 may optionally include, wherein the control circuitry includes a linear controller, the linear controller includes a multiplier, the multiplier including a first input to receive input information based on the first value of the output information, a second input to receive information from a memory circuit in the control circuitry, and an output to provide the gain factor.

In Example 4, the subject matter of Example 1 may optionally include, wherein the control circuitry is to receive a clock signal and generate the error information based on timing of the clock signal, and the control circuitry is to adjust the gain of the forward path in each cycle of the clock signal.

In Example 5, the subject matter of Example 1 may optionally include, wherein the control circuitry is to generate the output information based on the error information provided to an addition forward path coupled to the output, and adjust a gain of the additional forward path based on an additional gain factor computed based at least in part on the first value of the output information during the first time interval in order to cause the output information to have the second value during the second time interval.

In Example 6, the subject matter of any of Examples 1-5 may optionally include, further comprising an analog-to-digital converter to generate the error information based on the feedback voltage and a range of reference voltages.

In Example 7, the subject matter of any of Examples 1- may optionally include, wherein the control circuitry includes a first forward path to receive the error information, the first forward path including a first adaptive gain circuitry to generate the gain factor to adjust the gain of the first forward path, a second forward path to receive the error information, the second forward path including a second adaptive gain circuitry to generate an additional gain factor to adjust a gain of the second forward path based on the additional gain factor, and a feedback path coupled to the output and the first and second forward paths.

Example 8 includes subject matter (such as a device, an electronic apparatus (e.g., circuit, electronic system, or both), or a machine) including an output port to provide control information to control transistors of a power switching unit, and a control circuitry to generate the control information such that a value of an output voltage generated by the power switching unit is less than a value of an input voltage provided to the power switching unit, compute a value of correction information during a first time interval when the output voltage has a first value within a target value range, and adjust a value of the control information, based on the correction information, during a second time interval when the output voltage has a second value outside the target value range.

In Example 9, the subject matter of Example 8 may optionally include, wherein the control circuitry is to compute the value of the correction information based on a rate of change of a current at a node where the output voltage is provided.

In Example 10, the subject matter of Example 8 may optionally include, wherein the correction information indicates an amount of current to be adjusted at the node during the second time interval.

In Example 11, the subject matter of any of Examples 8-10 may optionally include, wherein the control circuitry is to receive a clock signal, and the control circuitry is to adjust the value of the control information at a time less than one cycle of the clock signal from a time the second value of the output voltage is detected to be outside the target value range.

In Example 12, the subject matter of any of Examples 8-10 may optionally include, wherein the control circuitry is to receive a clock signal, and wherein the second value of the output voltage is detected to be outside the target value range at a first edge of the clock signal, and the control circuitry is to start to adjust the value of the control information at a second edge of the clock signal, the second edge occurring in less than one cycle of the clock signal from an occurrence of the first edge.

In Example 13, the subject matter of any of Examples 8-10 may optionally include, wherein the control circuitry is to receive a clock signal, and the control circuitry is to compute the correction information during a time interval between two consecutive edges of the clock signal.

In Example 14, the subject matter of any of Examples 8-10 may optionally include, wherein the control circuitry is to receive a clock signal, the control circuitry is to compute the correction information based on a count value, and the count value corresponds to a number of rising and falling edges of the clock signal.

In Example 15, the subject matter of any of Examples 8-10 may optionally include, wherein the control circuitry is to compute the value of the correction information based on a rate of change of a current from a time the second value of the output voltage is detected to be outside the target value range to a time a half cycle after the time the second value of the output voltage is detected to be outside the target value range.

In Example 16, the subject matter of any of Examples 8-10 may optionally include, wherein the control circuitry is to adjust the value of the control information during a first portion of the second time interval based on the correction information, and the control circuitry is to adjust the value of the control information during a second portion of the second time interval based on error information generated from a comparison of a range of reference voltages with a feedback voltage generated from the output voltage.

In Example 17, the subject matter of Example 16 may optionally include, further comprising an analog-to-digital converter to perform the comparison, Example 18 includes subject matter (such as a device, an electronic apparatus circuit, electronic system, or both), or a machine) including a power switching unit to receive an input voltage to provide an output voltage having a value less than a value of the input voltage, an error code generator to generate first error correction information and second error correction information based on errors in the output voltage, a first controller to generate first output information to control the power switching unit during a first mode when the output voltage has a first value within a target value range, the first controller to compute a gain of a forward path during the first mode in order to cause the first output information to have a second value during the first mode, and a second controller to compute a value of correction information during the first mode, and to control the power switching unit during a second mode, based on the correction information, when the output voltage has a second value outside the target value range.

In Example 19, the subject matter of Example 18 may optionally include, wherein the first controller includes forward paths implemented based on a single set of coefficients.

In Example 20, the subject matter of any of Examples 15-19 may optionally include, wherein the first controller includes a memory circuit to store information to compute the gain.

In Example 21, the subject matter of any of Examples 15-19 may optionally include, wherein the second controller is to compute the value of the correction information based on a rate of change of a current at a node where the output voltage is provided.

In Example 22, the subject matter of any of Examples 15-19 may optionally include, wherein the second controller is to control the power switching unit in an initial stage of the second mode, and the second controller is to control the power switching unit in a second stage of the second mode based on error information different from the correction information.

Example 23 includes subject matter (such as a device, an electronic apparatus (e.g., circuit, electronic system, or both), or a machine) including a semiconductor die, a processing unit located on the semiconductor die, and a voltage regulator located on the semiconductor die and coupled to the processing unit, the voltage regulator including a power switching unit to receive an input voltage to provide an output voltage having a value less than a value of the input voltage, an error code generator to generate first error correction information and second error correction information based on errors in the output voltage, a first controller to generate first output information to control the power switching unit during a first mode when the output voltage has a first value within a target value range, the first controller to compute a gain of a forward path during the first mode in order to cause the output information to have a second value during the first mode, and a second controller to compute a value of correction information during the first mode, and to control the power switching unit during a second mode, based on the correction information, when output voltage has a second value outside the target value range.

In Example 24, the subject matter of Example 23 may optionally include, wherein the first mode includes a linear mode, and the second mode includes a non-linear mode.

In Example 25, the subject matter of Example 23 or 24 may optionally include, wherein the semiconductor die, the processing unit, and the voltage regulator are parts of a system-on-chip (SoC).

Example 26 includes subject matter (such as a method of operating a device, an electronic apparatus (e.g., circuit, electronic system, or both), or a machine) including generating control information at a first controller of a voltage regulator to control a voltage at a node, computing a gain of a forward path in the first controller to adjust a first value of the control information during a first mode of the voltage regulator when the voltage has a first value within a target value range, generating correction information at a second controller of the voltage regulator during the first mode, and adjusting a second value of the control information, based on the correction information, during a second mode of the voltage regulator when the voltage has a second value outside the target value range.

In Example 27, the subject matter of Example 26 may optionally include, wherein the forward path is part of multiple forward paths of the first controller, and the multiple paths are implemented using a single set of coefficients.

In Example 28, the subject matter of Example 26 or 27 may optionally include, wherein generating the correction information includes computing a value of the correction information based on a rate of change of a current at the node.

In Example 29, the subject matter of Example 26 or 27 may optionally include, wherein adjusting the value of the control information includes applying correction information to the voltage in less than one cycle of a clock signal in the voltage regulator after the second value of the voltage is detected to be outside the target value range.

Example 30 includes subject matter (such as a device, an electronic apparatus (e.g., circuit, electronic system, or both), or machine) including means for performing any of the subject matter of Example 26 through Example 29.

The subject matter of Example 1 through Example 30 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

In the detailed description and the claims, a list of items joined by the term "at least one of" can mean any combination of the listed items. For example, if items A and B are listed, then the phrase "at least one of A and B" can mean A only; B only; or A and B. In another example, if items A, B, and C are listed, then the phrase "at least one of A, B and C" can mean A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements.

In the detailed description and the claims, a list of items joined by the term "one of" can mean only one of the list items. For example, if items A and B are listed, then the phrase "one of A and B" can mean A only (excluding B), or B only (excluding A). In another example, if items A, B, and C are listed, then the phrase "one of A, B and C" can mean A only; B only; or C only. Item A can include a single element or multiple elements. Item B can include a single element or multiple elements. Item C can include a single element or a multiple elements.

The Abstract is provided to comply with 37 C.F.R. Section 1.74(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   an output to provide control information to control transistors of a power switching unit;
   a node to receive a feedback voltage based on an output voltage generated by the power switching unit;
   an analog-to-digital error code generator including a first node to receive a feedback voltage and a second node to receive a reference voltage, the feedback voltage generated from the output voltage, the analog-to-digital error code generator to generate first error information and second error information from the feedback voltage and the reference voltage; and
   control circuitry including a linear controller, and a non--linear controller, wherein:
   the linear controller includes a forward path to generate a first output information at an output of the linear controller based on the first error information, and gain circuitry to adjust a gain of the forward path based on a gain factor computed based at least in part on a first value of the first output information generated by the linear controller during a first time interval in order to cause the first output information to have a second value during a second time interval; and
   the non-linear controller includes a first input to receive the first error information from the analog-to-digital error code generator, and a second input to receive the second error information from the analog-to-digital error code generator, and a third input to receive the first output information from the linear controller, the non-linear controller responsive to the first error information, the second error information, and the first output information from the linear controller to generate a second output information wherein the control information is one of the first output information and the second output information.

2. The apparatus of claim 1, wherein the linear controller is to cause the first output information to have the first and second values when the output voltage is within a target value range.

3. The apparatus of claim 1, wherein the linear controller includes a multiplier, the multiplier including:
   a first input to receive input information based on the first value of the first output information;
   a second input to receive information associated with a value of the output voltage, the information stored in a memory circuit in the control circuitry; and
   an output to provide the gain factor based on the input information and the associated with the value of the output voltage.

4. The apparatus of claim 1, wherein the analog-to-digital error code generator is to receive a clock signal and generate the first error information and the second error information based on timing of the clock signal, and the linear controller is to adjust the gain of the forward path in each cycle of the clock signal.

5. The apparatus of claim 1, wherein the linear controller includes an additional forward path, and the linear controller is to:
generate the first output information based on the first error information provided to the addition forward path; and
adjust a gain of the additional forward path based on an additional gain factor computed based at least in part on the first value of the first output information during the first time interval in order to cause the first output information to have the second value during the second time interval.

6. The apparatus of claim 1, wherein the analog-to-digital code generator to:
generate multiple reference voltages from the reference voltage;
generate the first error information from the multiple voltages and the feedback voltage; and
generate the second error information from the multiple voltages and the feedback voltage.

7. The apparatus of claim 1, wherein the forward path of the linear controller is a first forward path, the gain circuitry is a first gain circuitry, and the linear controller includes:
a second forward path to receive the first error information, the second forward path including a second gain circuitry to generate an additional gain factor to adjust a gain of the second forward path based on the additional gain factor; and
a feedback path coupled to the output of the linear controller and the first forward path and the second forward path.

8. An apparatus comprising:
an output port to provide control information to control transistors of a power switching unit;
a control circuitry to generate the control information such that a value of an output voltage generated by the power switching unit is less than a value of an input voltage provided to the power switching unit;
an analog-to-digital error code generator including a first node to receive a feedback voltage and a second node to receive a reference voltage, the feedback voltage generated from the output voltage, the analog-to-digital error code generator to generate first error information and second error information from the feedback voltage and the reference voltage; and
the control circuitry including a linear controller, and a non-linear controller, wherein:
the linear controller is to generate the control information based on the first error information;
the non-linear controller is to compute a value of correction information based on the first error information, the second error information, and the first output information from the linear controller during a first time interval when the output voltage has a first value within a target value range; and
the linear controller is to adjust a value of the control information, based on the correction information, during a second time interval when the output voltage has a second value outside the target value range.

9. The apparatus of claim 8, wherein the non-linear controller is to compute the value of the correction information based on a rate of change of a current at a node where the output voltage is provided.

10. The apparatus of claim 8, wherein the correction information indicates an amount of current to be adjusted at the node during the second time interval.

11. The apparatus of claim 8, wherein the control circuitry is to receive a clock signal, and the linear controller is to adjust the value of the control information at a time less than one cycle of the clock signal from a time the second value of the output voltage is detected to be outside the target value range.

12. The apparatus of claim 8, wherein the control circuitry is to receive a clock signal, and wherein:
the second value of the output voltage is detected to be outside the target value range at a first edge of the clock signal; and
the linear controller is to start to adjust the value of the control information at a second edge of the clock signal, the second edge occurring in less than one cycle of the clock signal from an occurrence of the first edge.

13. The apparatus of claim 8, wherein the control circuitry is to receive a clock signal, and the non-linear controller is to compute the correction information during a time interval between two consecutive edges of the clock signal.

14. The apparatus of claim 8, wherein the control circuitry is to receive a clock signal, the non-linear controller is to compute the correction information based on a count value, and the count value corresponds to a number of rising and falling edges of the clock signal.

15. The apparatus of claim 8, wherein the non-linear controller is to compute the value of the correction information based on a rate of change of a current from a time the second value of the output voltage is detected to he outside the target value range to a time a half cycle after the time the second value of the output voltage is detected to be outside the target value range.

16. The apparatus of claim 8, wherein:
the control circuitry is to adjust the value of the control information during a first portion of the second time interval based on the correction information; and
the control circuitry is to adjust the value of the control information during a second portion of the second time interval based on the first error information and the second error information generated from a comparison of a range of reference voltages with a feedback voltage generated from the output voltage, the range of reference voltages generated from the reference voltage.

17. The apparatus of claim 16, wherein the analog-to-digital error code generator includes an analog-to-digital converter to perform the comparison.

18. An apparatus comprising:
a semiconductor die;
a processing unit located on the semiconductor die; and
a voltage regulator located on the semiconductor die and coupled to the processing unit, the voltage regulator including:
an output to provide output information to control transistors of a power switching unit;
a node to receive a feedback voltage based on an output voltage generated by the power switching unit;
an analog-to-digital error code generator including a first node to receive a feedback voltage and a second node to receive a reference voltage, the feedback voltage generated from the output voltage, the analog-to-digital error code generator to generate first error information and second error information from the feedback voltage and the reference voltage; and
control circuitry including a linear controller, and a non-linear controller, wherein:

the linear controller includes a forward path to generate a first output information at an output of the linear controller based on the first error information, and gain circuitry to adjust a gain of the forward path based on a gain factor computed based at least in part on a first value of the first output information generated by the linear controller during a first time interval in order to cause the first output information to have a second value during a second time interval; and the non-linear controller includes a first input to receive the first error information from the analog-to-digital error code generator, and a second input to receive the second error information from the analog-to-digital error code generator, and a third input to receive the first output information from the linear controller, the second controller responsive to the first error information, the second error information, and the first output information from the linear controller to generate a second output information, wherein the control information is one of the first output information and the second output information.

19. The apparatus of claim 18, wherein the semiconductor die, the processing unit, and the voltage regulator are parts of a system-on-chip (SoC).

20. The apparatus of claim 18, further comprising a connector coupled to the processing unit, the connector conforming with one of Universal Serial Bus (USB), Display Port (DP), High-Definition Multimedia Interface (HDMI), Thunderbolt, Peripheral Component Interconnect Express (PCIe), and Ethernet specifications.

* * * * *